(12) United States Patent
Ohkubo

(10) Patent No.: US 6,229,916 B1
(45) Date of Patent: May 8, 2001

(54) COLOR TRANSFORMATION LOOK-UP TABLE

(75) Inventor: Akito Ohkubo, Kanagawa-ken (JP)

(73) Assignee: Fuji Photo Film Co., Ltd., Minamiashigara (JP)

(*) Notice: Subject to any disclaimer, the term of this patent is extended or adjusted under 35 U.S.C. 154(b) by 0 days.

(21) Appl. No.: 09/163,430

(22) Filed: Sep. 30, 1998

(30) Foreign Application Priority Data

Sep. 30, 1997 (JP) .................................................. 9-265334

(51) Int. Cl.7 ........................................................ G06K 9/00
(52) U.S. Cl. ............................................. 382/167; 358/520
(58) Field of Search ................................... 382/162, 167; 358/518, 520, 523, 524, 504

(56) References Cited

U.S. PATENT DOCUMENTS

| | | | | |
|---|---|---|---|---|
| 4,958,200 | * | 9/1990 | Alessi et al. | 358/518 |
| 5,339,176 | * | 8/1994 | Smilansky et al. | 358/504 |
| 5,920,358 | * | 7/1999 | Takemura | 382/167 |
| 5,949,962 | * | 9/1999 | Suzuki et al. | 395/109 |
| 6,078,936 | * | 6/2000 | Martin et al. | 358/1.18 |

FOREIGN PATENT DOCUMENTS

| | | |
|---|---|---|
| 7-86814 | 9/1995 | (JP) . |
| 7-86815 | 9/1995 | (JP) . |
| 9-9086 | 1/1997 | (JP) . |
| 10-117294 | 5/1998 | (JP) . |
| 10-173943 | 6/1998 | (JP) . |

OTHER PUBLICATIONS

"An Improved Predictor of Colourfulness in a Model of Colour Vision," (Color Research and Application), R.W Hunt, vol. 19, No. 1, Feb. 1994, pp. 23–33.

"Revision of the Chroma and Hue Scales of a Nonlinear Color–Appearance Model," (Color Research and Application), Yoshinobu Nayatani, vol. 20, No. 3, Jun. 1995, pp. 143–167.

"Formulation and Testing of an Incomplete–Chromatic– Adaption Model," (Color Research and Application), M. Fairchild, vol. 16, No. 4, Aug. 1991, pp. 243–250.

"Metameric color matching in subtractive color photography," (Photographic Science and Engineering), Noboru Ota, vol. 16, No. 2, Mar.–Apr. 1972, pp. 136–143.

"Color Engineering," Noboru Ota, publishing office of Tokyo Denki University, pp. 186–189 and 212–217.

* cited by examiner

*Primary Examiner*—Amelia Au
*Assistant Examiner*—Jingge Wu

(57) ABSTRACT

A color transformation look-up table is provided, which is to be referred to when image signals for a non-self-luminous displaying medium are to be transformed into image signals for a self-luminous displaying medium such that appearances of perceived colors may become identical between images displayed on the two displaying media. The look-up table includes a function for transforming a dynamic range of the image signals for the non-self-luminous displaying medium into a dynamic range of the image signals for the self-luminous displaying medium such that a range of brightness of an image, which the non-self-luminous displaying medium can display, may become approximately identical with a range of brightness of an image, which the self-luminous displaying medium can display. The look-up table also includes a function for carrying out signal transformation in accordance with a chromatic adaptation model such that the appearances of perceived colors may become identical between the images displayed on the two displaying media.

22 Claims, 11 Drawing Sheets

⟨DP⟩
LUT1

| R , G , B → X , Y , Z | |
|---|---|
| 0 , 0 , 0 | 0.18, 0.19, 1.10 |
| 0 , 0 , 5 | 1.14, 1.16, 1.19 |
| 0 , 0 , 10 | . . . |
| . . . | . . . |
| 100 , 100 , 100 | 40.2, 50.2, 60.2 |
| . . . | . . . |
| 255 , 255 , 245 | . . . |
| 255 , 255 , 250 | . . . |
| 255 , 255 , 255 | 70.2, 80.5, 90.1 |

⟨NIF⟩
LUT3

| R , G , B → X , Y , Z | |
|---|---|
| 0 , 0 , 0 | 0.17, 0.11, 0.18 |
| 0 , 0 , 5 | 1.8, 1.9, 2.0 |
| 0 , 0 , 10 | . . . |
| . . . | . . . |
| 100 , 100 , 100 | 50.1, 50.4, 52.1 |
| . . . | . . . |
| 255 , 255 , 245 | . . . |
| 255 , 255 , 250 | . . . |
| 255 , 255 , 255 | 70.8, 80.4, 80.2 |

⟨DP⟩
LUT2

| R , G , B ← L*, a*, b* | |
|---|---|
| -4.8, -5.2, -6.4 | -5, -200, -200 |
| . . . | -5, -200, -195 |
| . . . | . . . |
| . . . | . . . |
| 130 , 138 , 129.2 | 50 , 0 , 0 |
| . . . | . . . |
| . . . | . . . |
| . . . | . . . |
| 300 , 321 , 298 | 100, +200, +200 |

⟨NIF⟩
LUT4

| R , G , B ← L*, a*, b* | |
|---|---|
| -4.5, -5.7, -6.0 | -5, -200, -200 |
| . . . | -5, -200, -195 |
| . . . | . . . |
| . . . | . . . |
| 129 , 132 , 133 | 50 , 0 , 0 |
| . . . | . . . |
| . . . | . . . |
| . . . | . . . |
| 302 , 318 , 300 | 100, +200, +200 |

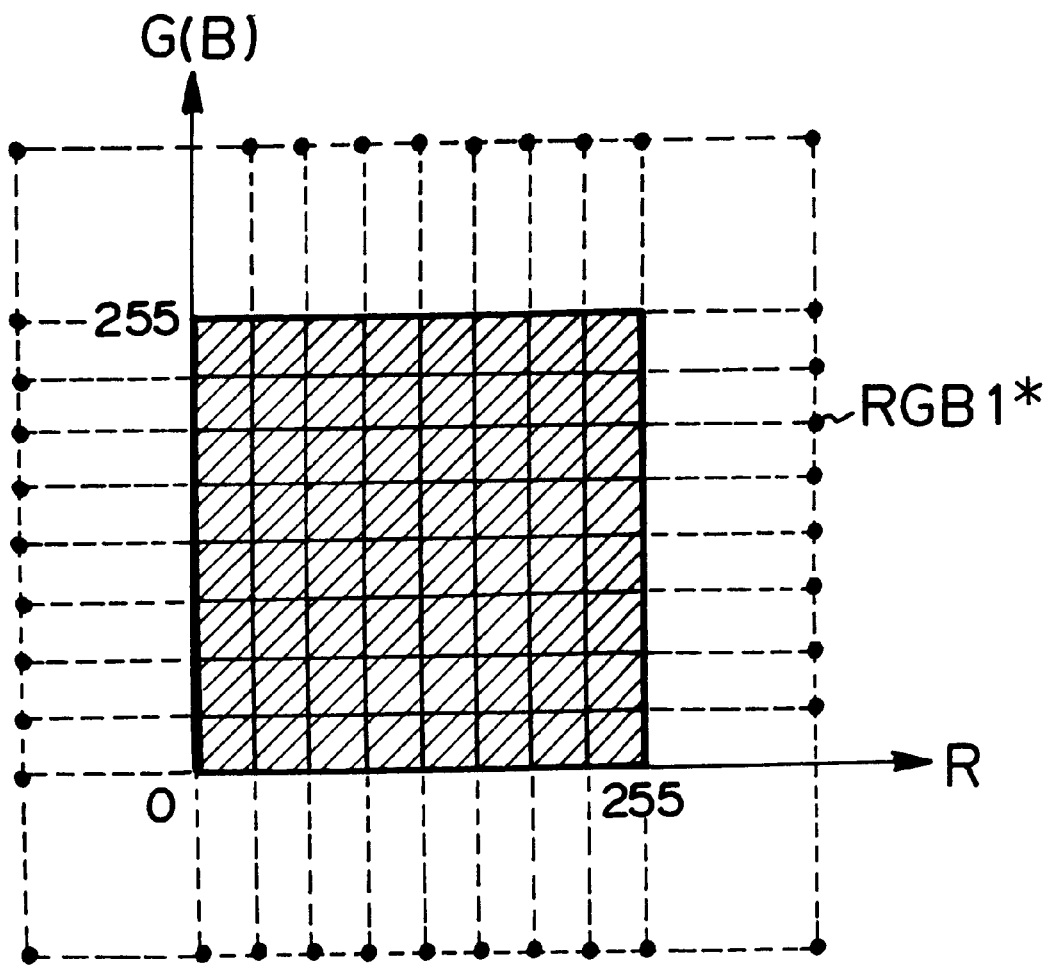
F I G. 7

DIRECT TRANSFORMATION RELATIONSHIP
INVERSE TRANSFORMATION RELATIONSHIP

X-RG PLANE

F I G. 12A
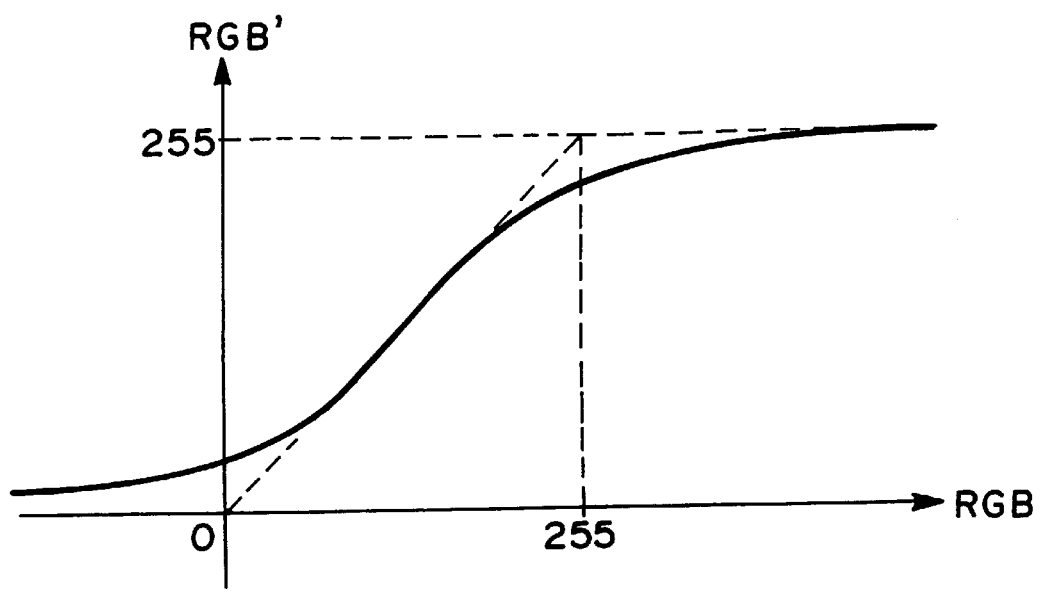
F I G. 12B
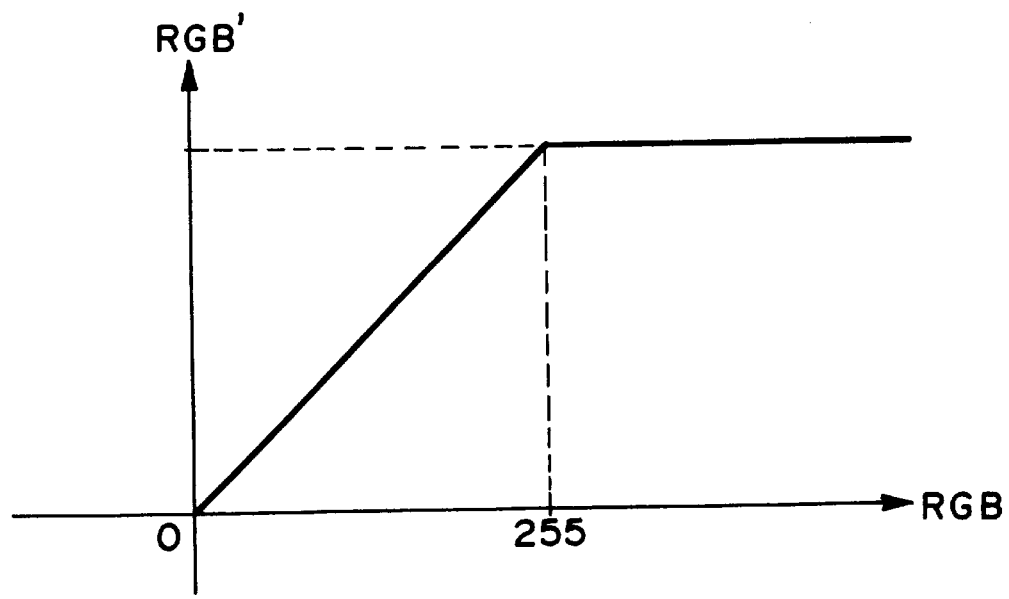

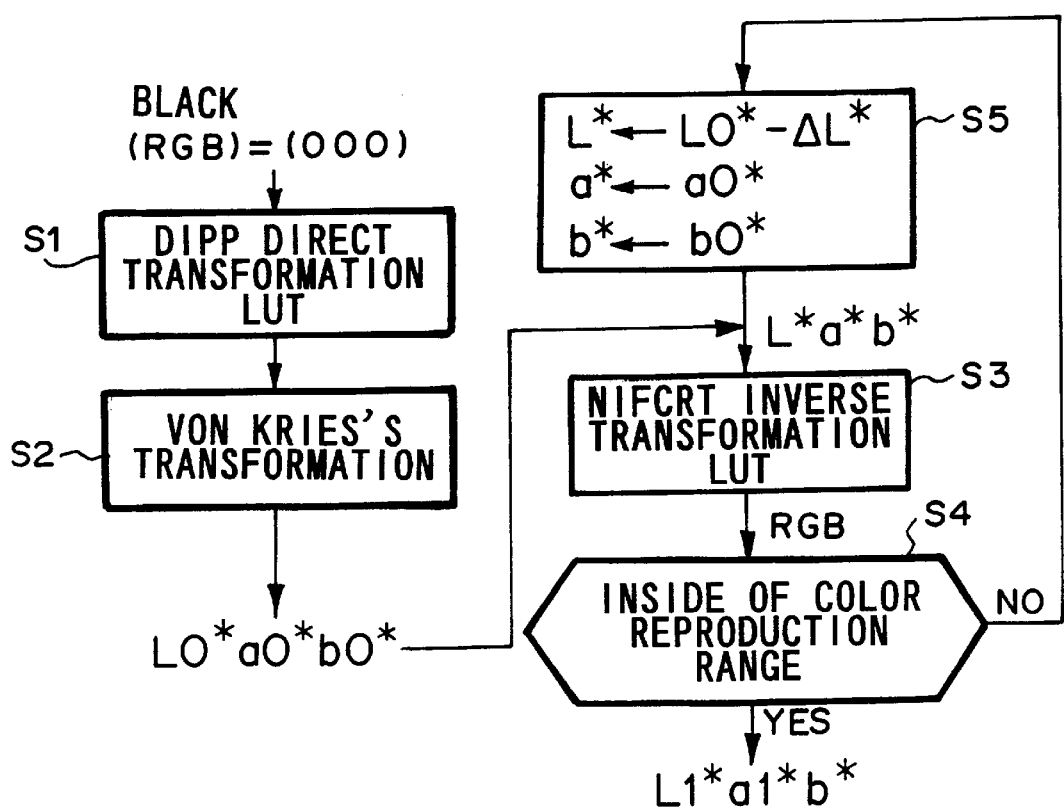
F I G. 13

COLOR TRANSFORMATION LOOK-UP TABLE

BACKGROUND OF THE INVENTION

1. Field of the Invention

This invention relates to a color transformation look-up table, which represents a correspondence relationship between image signals for a non-self-luminous displaying medium, such as a photograph, and image signals for a self-luminous displaying medium, such as a cathode ray tube (CRT) display device or a liquid crystal display device, and is to be referred to when the image signals for the non-self-luminous displaying medium and the image signals for the self-luminous displaying medium are to be transformed to each other such that the appearances of perceived colors may become identical between images displayed on the non-self-luminous displaying medium and the self-luminous displaying medium. This invention also relates to a method and apparatus for forming the color transformation look-up table. This invention further relates to a method and apparatus for transforming colors of an image by use of the color transformation look-up table.

2. Description of the Prior Art

Hard copy images, which have been recorded on non-self-luminous displaying media, such as sheets of film or photographs, have heretofore been read out with scanners, or the like, and digital image signals having thus been obtained have heretofore been furnished to users. Also, hard copy images, such as images on prints, have heretofore been reproduced from digital image signals, which have been acquired with digital cameras, or the like, by users, and the thus reproduced hard copy images have heretofore been furnished to the users. The digital image signals, which have been furnished to the users, or the digital image signals, which have been acquired with the digital cameras, or the like, can be utilized by the users for reproducing and displaying soft copy images on self-luminous displaying media, such as CRT display devices or liquid crystal display devices connected to, for example, personal computers. Further, the users can reproduce the soft copy images from the furnished digital image signals, can display the reproduced soft copy images on CRT display devices, or the like, and can carry out processing, such as addition of character patterns or symbol patterns, on the displayed images. From the digital image signals having thus been processed by the users, hard copy images can be reproduced.

Soft copy images, which are displayed on the self-luminous displaying media, such as CRT display devices, are reproduced with image reproduction systems, which are quite different from the image reproduction systems for hard copy images. It has been known that, in cases where a soft copy image and a hard copy image are reproduced from the same image signals and displayed respectively on a self-luminous displaying medium and a non-self-luminous displaying medium, the colors of the two images are visually perceived as different colors. In order for such problems to be eliminated, there have heretofore been proposed various techniques for transforming the colors of an image such that the appearances of perceived colors may become identical between a hard copy image and a soft copy image.

For example, as for how an image is to be transformed by considering the viewing conditions (such as the correlated color temperature of the white color, the luminance, and the ambient conditions) such that the same color appearances may be obtained when the image is viewed under certain conditions and when the image is viewed under different conditions, it has been proposed to employ transformation techniques which are ordinarily referred to as the chromatic adaptation transformation or chromatic adaptation models (i.e., color appearance models). The transformation techniques are described in, for example, Japanese Patent Publication Nos. 7(1995)-86814 and 7(1995)-86815; "Color Research and Application," Volume 19, Number 1, 1994, R. W. G. Hunt; "Color Research and Application," Vol. 20, No. 3, 1995, N. Nayatani; and "Color Research and Application," Vol. 16, No. 4, 1991, M. D. Fairchild. As an appearance model, a Von Kries's chromatic adaptation prediction formula (a Von Kries's rule) is known as a basic one among various chromatic adaptation prediction formulas ("Color Engineering" by Noboru Ota, publishing office of Tokyo Denki University).

In Japanese Unexamined Patent Publication No. 10(1998)-173943, the applicant proposed a method for color compensation, which is carried out when colors of an image are transformed in accordance with the chromatic adaptation model described above such that the appearances of perceived colors may become identical between images, the method being capable of compensating for colorimetric errors and inconformity of color appearances. With the proposed method, at least one patch of a color is outputted as a hard copy image, and at least one patch of a color is outputted as a soft copy image, such that the patches may have conforming calorimetric values. Also, the patches of the two images are visually compared with each other from a viewing position of the person, who views the patches. In cases where the colors of the patches of the two images are perceived as being different, a patch having calorimetric values slightly shifted from the conforming colorimetric values is outputted with respect to at least one of the two images, and the visual comparison is again made. Such operation is repeated until the colors of the patches of the two images are perceived to be identical. Color compensation is then made with respect to at least one of the two images in accordance with the calorimetric values of the patches of the two images, which are perceived to be of the same color. In this manner, the inconformity of the color appearances is compensated for.

Ordinarily, in cases where the transformation of image signals in accordance with the chromatic adaptation model is carried out, the image signals, which the display device processes directly, are temporarily transformed into image signals of a calorimetric system (a second colorimetric system), which does not depend upon the display device, and the image signals having been obtained from the temporary transformation are subjected to the transformation of the image signals in accordance with the chromatic adaptation model. The image signals, which have been obtained from the transformation in accordance with the chromatic adaptation model, are then returned to the image signals of the original colorimetric system (a first colorimetric system). As the techniques for transforming image signals into image signals of a different calorimetric system, various techniques for accurately carrying out the signal transformation have heretofore been proposed. For example, a technique for calculating an inverse transformation relationship from an analytic formula with repeated operations by using a Newton-Raphson technique (an N-R technique) has been proposed in "Photographic Science and Engineering," Vol. 16, Num. 2, Mar.-Apr. 1972, pp. 136–143. Also, as a method capable of accurately transforming color signals from the second calorimetric system to the first calorimetric system by utilizing a direct transformation relationship for the transformation of image signals, which a display device processes directly, into image signals of a colorimetric system, which does not depend upon the display device, the applicant proposed a method of carrying out an inverse transformation operation with the N-R technique in Japanese Unexamined Patent Publication No. 9(1997)-9086.

With the method proposed in Japanese Patent Application No. 7 (1995)-156555, a plurality of color patches differing in color stepwise are subjected to colorimetric determination, and a relationship between color signals (CMY or RGB) and stimulus value signals XYZ is thereby found. Also, the method of least squares is applied to the thus found relationship, and a relationship between first virtual color signals and first virtual stimulus value signals is thereby found. The relationship having been found in this manner is set as a direct transformation table. Thereafter, a first inverse transformation table is formed from the direct transformation table by utilizing the Newton technique. Further, a second inverse transformation table is formed from the first inverse transformation table by replacing the relationship between the first virtual color signals and the first virtual stimulus value signals in the first inverse transformation table by a physically matching relationship between second virtual color signals and second virtual stimulus value signals. An inverse transformation table is then obtained by mapping the second inverse transformation table, and stimulus value signals XYZ are transformed into color signals (CMY or RGB) by utilizing the obtained inverse transformation table.

It has also been known that the color reproduction range varies for a soft copy image and a hard copy image. In cases where signal transformation between image signals for a self-luminous displaying medium and image signals for a non-self-luminous displaying medium is carried out in accordance with the chromatic adaptation model described above, problems often occur in that certain colors cannot be reproduced and displayed on either one displaying medium. As one of techniques for solving such problems, processing (Gamut mapping, hereinbelow referred to as the Gamut processing) for mapping the image signals, which fall outside the color reproduction range of the one displaying medium, to signals falling within the color reproduction range. Also, in Japanese Unexamined Patent Publication No. 10(1998)-117294, the applicant proposed a Gamut outside signal estimating method as a method of transforming colors, in which Gamut processing is carried out such that, even at regions in the vicinity of the boundary of the color reproduction range, an unnatural feeling or a large variation may not occur in colors of an image reproduced and displayed in accordance with image signals after being transformed.

With the method proposed in Japanese Unexamined Patent Publication No. 10(1998)-117294, after an inverse transformation relationship, which is the relationship of color signals CMYK with respect to stimulus value signals XYZ within the color reproduction range, has been found, the color signal K constituting the color signals CMYK at the boundary of the color reproduction range is set to be a color signal falling outside the color reproduction range. Also, color signals CMY falling outside the color reproduction range are estimated with the multiple regression analysis technique by using the color signals CMY at the boundary of the color reproduction range, and a different inverse transformation table is thereby formed. By use of the thus formed inverse transformation table, stimulus value signals XYZ are transformed into color signals CMYK. Thereafter, the color signals CMYK are mapped to signals falling within the color reproduction range by using the Gamut mapping technique described above.

As described above, the techniques for transforming colors of an image such that the appearances of perceived colors may become identical between a hard copy image and a soft copy image and the techniques for solving the problems due to a difference in color reproduction range between the hard copy image and the soft copy image have heretofore been proposed independently. However, there has not yet been proposed an idea for applying the aforesaid techniques as a simple method or a simple apparatus to a system for reproducing a soft copy image from digital image signals, which have been acquired from a hard copy image, or reproducing a hard copy image from digital image signals, which are used for reproducing a soft copy image.

SUMMARY OF THE INVENTION

The primary object of the present invention is to provide a color transformation look-up table, which represents a correspondence relationship between image signals for a non-self-luminous displaying medium and image signals for a self-luminous displaying medium and is appropriate for use in carrying out image color transformation such that the appearances of perceived colors may become identical between a hard copy image and a soft copy image reproduced from the same image information and displayed respectively on the non-self -luminous displaying medium and the self-luminous displaying medium, and such that the color appearances approximately identical with those of an original image may be obtained when, for example, a transformed image (image signals) is subjected to certain processing and then returned to the image (image signals) reproduced by the original displaying medium.

Another object of the present invention is to provide a method of forming the color transformation look-up table.

A further object of the present invention is to provide an apparatus for forming the color transformation look-up table.

A still further object of the present invention is to provide a method of transforming colors of an image easily by referring to the color transformation look-up table.

Another object of the present invention is to provide an apparatus for transforming colors of an image easily by referring to the color transformation look-up table.

Each of first and second color transformation look-up tables in accordance with the present invention represents a correspondence relationship between image signals for a non-self-luminous displaying medium, such as a photograph, and image signals for a self-luminous displaying medium, such as a CRT display device, and is to be referred to when the image signals for the non-self-luminous displaying medium and the image signals for the self-luminous displaying medium are to be transformed to each other such that the appearances of perceived colors may become identical between images displayed on the non-self-luminous displaying medium and the self-luminous displaying medium. (Hereinbelow, the look-up table will often be referred to simply as the table or the LUT.)

Firstly, a first color transformation look-up table in accordance with the present invention, which is to be referred to when the image signals for the non-self-luminous displaying medium are to be transformed into the image signals for the self-luminous displaying medium, will be described hereinbelow. Also, a first method and apparatus for forming the first color transformation look-up table and a first method and apparatus for transforming colors of an image, in which the first color transformation look-up table is utilized, will be described hereinbelow.

The present invention provides a first color transformation look-up table, which represents a correspondence relationship between image signals for a non-self-luminous displaying medium and image signals for a self-luminous displaying medium and is to be referred to when the image signals for the non-self-luminous displaying medium are to be transformed into the image signals for the self-luminous displaying medium such that appearances of perceived colors may become identical between an image displayed on the self-luminous displaying medium and an image displayed on the non-self-luminous displaying medium, the color transformation look-up table comprising:

i) a dynamic range compensating function for transforming a dynamic range of the image signals for the non-self-luminous displaying medium into a dynamic range of the image signals for the self-luminous displaying medium such that a range of brightness of an image, which the non-self-luminous displaying medium is capable of displaying, may become approximately identical with a range of brightness of an image, which the self-luminous displaying medium is capable of displaying, and ii) a color transforming function for transforming the image signals for the non-self-luminous displaying medium into the image signals for the self-luminous displaying medium in accordance with a chromatic adaptation model (e.g., a chromatic adaptation model according to the Von Kries's chromatic adaptation rule) such that the appearances of perceived colors may become identical between the image displayed on the self-luminous displaying medium and the image displayed on the non-self-luminous displaying medium.

The present invention also provides a first method of forming a color transformation look-up table, with which the first color transformation look-up table in accordance with the present invention is formed, the method comprising the steps of:

i) calculating a first correspondence relationship for transformation of color signals, which are capable of being reproduced on the non-self-luminous displaying medium, from first calorimetric system signals into second calorimetric system signals, ii) calculating a second correspondence relationship for transformation of color signals, which are capable of being reproduced on the self-luminous displaying medium, from the second colorimetric system signals into the first colorimetric system signals, iii) carrying out dynamic range compensation for transforming the dynamic range of the color signals, which are capable of being reproduced on the non-self-luminous displaying medium, into the dynamic range of the color signals, which are capable of being reproduced on the self-luminous displaying medium, in accordance with the first correspondence relationship and the second correspondence relationship, the transformation being carried out for the respective color signals, which are capable of being reproduced on the non-self-luminous displaying medium, iv) carrying out color transformation for transforming the color signals, which are capable of being reproduced on the non-self-luminous displaying medium, into the color signals, which are capable of being reproduced on the self-luminous displaying medium, in accordance with the chromatic adaptation model such that the appearances of perceived colors may become identical between the image displayed on the self-luminous displaying medium and the image displayed on the non-self-luminous displaying medium, and v) storing the color signals, which are capable of being reproduced on the non-self-luminous displaying medium, and the corresponding color signals capable of being reproduced on the self-luminous displaying medium, which have been obtained from the dynamic range compensation and the color transformation.

The term "first colorimetric system" as used herein means the colorimetric system representing the image signals, which the self-luminous displaying medium and the non-self-luminous displaying medium process directly, such as the RGB colorimetric system expressed with red (R), green (G), and blue (B), or the CMY colorimetric system expressed with cyan (C), magenta (M), and yellow (Y). The term "second calorimetric system" as used herein means the colorimetric system, which does not depend upon a display device and is appropriate for carrying out the signal transformation in accordance with the chromatic adaptation model described above, such as the CIE L*a*b* colorimetric system or the XYZ calorimetric system.

In the first method of forming a color transformation look-up table in accordance with the present invention, the color transformation should preferably comprise the steps of:

a) carrying out direct transformation of the first colorimetric system signals of the color signals, which are capable of being reproduced on the non-self-luminous displaying medium, into the second calorimetric system signals, the direct transformation being carried out in accordance with the first correspondence relationship, b) carrying out chromatic adaptation transformation in accordance with the chromatic adaptation model on the second calorimetric system signals, which have been obtained from the direct transformation, and c) carrying out inverse transformation of the signals, which have been obtained from the chromatic adaptation transformation, into the first colorimetric system signals, the inverse transformation being carried out in accordance with the second correspondence relationship.

Also, the dynamic range compensation should preferably comprise the steps of:

a) forming transformation range information in accordance with the first correspondence relationship and the second correspondence relationship, and b) transforming the signals, which have been obtained from the chromatic adaptation transformation or the direct transformation, in accordance with the transformation range information and at a stage between the step of the chromatic adaptation transformation and the step of the inverse transformation or at a stage between the step of the direct transformation and the step of the chromatic adaptation transformation.

Further, the first correspondence relationship should preferably be calculated with a technique for estimating signals outside a color reproduction range and with an inverse transformation operation, which utilizes a Newton-Raphson technique.

The Newton-Raphson technique is referred to simply as the N-R technique. The inverse transformation operation, which utilizes the Newton-Raphson technique, is the technique capable of accurately transforming the color signals from the second calorimetric system to the first colorimetric system by utilizing the direct transformation relationship for the transformation of the image signals, which the non-self-luminous displaying medium and the self-luminous displaying medium process directly, into the image signals of the colorimetric system, which does not depend upon the displaying media. The inverse transformation operation, which utilizes the Newton-Raphson technique, has been proposed by the applicant in Japanese Patent Application No. 7(1995)-156555.

The technique for estimating signals outside a color reproduction range is the technique for transforming colors, in which the Gamut processing is carried out such that, even at regions in the vicinity of the boundary of the color reproduction range, an unnatural feeling or a large variation may not occur in colors of an image reproduced and displayed in accordance with image signals after being transformed. The color transforming technique has been proposed by the applicant in Japanese Unexamined Patent Publication No. 10(1998)-117294.

The present invention further provides a first apparatus for forming a color transformation look-up table, in which the first color transformation look-up table is formed with the first method of forming a color transformation look-up table in accordance with the present invention, the apparatus comprising:

i) means for calculating a first correspondence relationship for transformation of color signals, which are capable of being reproduced on the non-self-luminous displaying medium, from first colorimetric system signals into second calorimetric system signals, ii) means for calculating a second correspondence relationship for transformation of color signals, which are capable of being reproduced on the self-luminous displaying medium, from the second colorimetric system signals into the first calorimetric system signals, iii) a dynamic range compensating means for carrying out dynamic range compensation for transforming the dynamic range of the color signals, which are capable of being reproduced on the non-self-luminous displaying medium, into the dynamic range of the color signals, which are capable of being reproduced on the self-luminous displaying medium, in accordance with the first correspondence relationship and the second correspondence relationship, the transformation being carried out for the respective color signals, which are capable of being reproduced on the non-self-luminous displaying medium, iv) a color transforming means for carrying out color transformation for transforming the color signals, which are capable of being reproduced on the non-self-luminous displaying medium, into the color signals, which are capable of being reproduced on the self-luminous displaying medium, in accordance with the chromatic adaptation model such that the appearances of perceived colors may become identical between the image displayed on the self-luminous displaying medium and the image displayed on the non-self-luminous displaying medium, and v) a storage means for storing the color signals, which are capable of being reproduced on the non-self-luminous displaying medium, and the corresponding color signals capable of being reproduced on the self-luminous displaying medium, which have been obtained from the dynamic range compensation and the color transformation.

In the first apparatus for forming a color transformation look-up table in accordance with the present invention, the color transforming means should preferably comprise:

a) a direct transformation means for carrying out direct transformation of the first calorimetric system signals of the color signals, which are capable of being reproduced on the non-self-luminous displaying medium, into the second calorimetric system signals, the direct transformation being carried out in accordance with the first correspondence relationship, b) a chromatic adaptation transformation means for carrying out chromatic adaptation transformation in accordance with the chromatic adaptation model on the second colorimetric system signals, which have been obtained from the direct transformation, and c) an inverse transformation means for carrying out inverse transformation of the signals, which have been obtained from the chromatic adaptation transformation, into the first colorimetric system signals, the inverse transformation being carried out in accordance with the second correspondence relationship.

Also, the dynamic range compensating means should preferably comprise a transformation range information forming means for forming transformation range information in accordance with the first correspondence relationship and the second correspondence relationship, and the dynamic range compensating means should preferably be means for transforming the signals, which have been obtained from the chromatic adaptation transformation or the direct transformation, in accordance with the transformation range information and at a stage between the step of the chromatic adaptation transformation and the step of the inverse transformation or at a stage between the step of the direct transformation and the step of the chromatic adaptation transformation.

Further, the means for calculating the first correspondence relationship should preferably comprise means for estimating signals outside a color reproduction range and an inverse transformation operation means, which utilizes a Newton-Raphson technique.

The present invention still further provides a first method of transforming colors of an image, which comprises transforming image signals for a non-self-luminous displaying medium into image signals for a self-luminous displaying medium by making reference to the aforesaid first color transformation look-up table in accordance with the present invention.

The present invention also provides a first apparatus for transforming colors of an image, comprising an image signal transforming means for transforming image signals for a non-self-luminous displaying medium into image signals for a self-luminous displaying medium by making reference to the aforesaid first color transformation look-up table in accordance with the present invention.

A second color transformation look-up table in accordance with the present invention, which is to be referred to when the image signals for the self-luminous displaying medium are to be transformed into the image signals for the non-self-luminous displaying medium, will be described hereinbelow. Also, a second method and apparatus for forming the second color transformation look-up table and a second method and apparatus for transforming colors of an image, in which the second color transformation look-up table is utilized, will be described hereinbelow.

The present invention further provides a second color transformation look-up table, which represents a correspondence relationship between image signals for a self-luminous displaying medium and image signals for a non-self-luminous displaying medium and is to be referred to when the image signals for the self-luminous displaying medium are to be transformed into the image signals for the non-self-luminous displaying medium such that appearances of perceived colors may become identical between an image displayed on the self-luminous displaying medium and an image displayed on the non-self-luminous displaying medium, the color transformation look-up table comprising:

i) a dynamic range compensating function for transforming a dynamic range of the image signals for the self-luminous displaying medium into a dynamic range of the image signals for the non-self-luminous displaying medium such that a range of brightness of an image, which the self-luminous displaying medium is capable of displaying, may become approximately identical with a range of brightness of an image, which the non-self-luminous displaying medium is capable of displaying, and ii) a color transforming function for transforming the image signals for the self-luminous displaying medium into the image signals for the non-self-luminous displaying medium in accordance with a chromatic adaptation model such that the appearances of perceived colors may become identical between the image displayed on the non-self-luminous displaying medium and the image displayed on the self-luminous displaying medium.

The present invention still further provides a second method of forming a color transformation look-up table, with which the second color transformation look-up table in accordance with the present invention is formed, the method comprising the steps of:

i) calculating a first correspondence relationship for transformation of color signals, which are capable of being reproduced on the self-luminous displaying medium, from first calorimetric system signals into second colorimetric system signals, ii) calculating a second correspondence relationship for transformation of color signals, which are capable of being reproduced on the non-self-luminous displaying medium, from the second colorimetric system signals into the first colorimetric system signals, iii) carrying out dynamic range compensation for transforming the dynamic range of the color signals, which are capable of being reproduced on the self-luminous displaying medium, into the dynamic range of the color signals, which are capable of being reproduced on the non-self-luminous displaying medium, in accordance with the first correspondence relationship and the second correspondence relationship, the transformation being carried out for the respective color signals, which are capable of being reproduced on the self-luminous displaying medium, iv) carrying out color transformation for transforming the color signals, which are capable of being reproduced on the self-luminous displaying medium, into the color signals, which are capable of being reproduced on the non-self-luminous displaying medium, in accordance with the chromatic adaptation model such that the appearances of perceived colors may become identical between the image displayed on the non-self-luminous displaying medium and the image displayed on the self-luminous displaying medium, and v) storing the color signals, which are capable of being reproduced on the self-luminous displaying medium, and the corresponding color signals capable of being reproduced on the non-self-luminous displaying medium, which have been obtained from the dynamic range compensation and the color transformation.

In the second method of forming a color transformation look-up table in accordance with the present invention, the color transformation should preferably comprise the steps of:

a) carrying out direct transformation of the first calorimetric system signals of the color signals, which are capable of being reproduced on the self-luminous displaying medium, into the second calorimetric system signals, the direct transformation being carried out in accordance with the first correspondence relationship, b) carrying out chromatic adaptation transformation in accordance with the chromatic adaptation model on the second colorimetric system signals, which have been obtained from the direct transformation, and c) carrying out inverse transformation of the signals, which have been obtained from the chromatic adaptation transformation, into the first calorimetric system signals, the inverse transformation being carried out in accordance with the second correspondence relationship.

Also, in the second method of forming a color transformation look-up table in accordance with the present invention, the dynamic range compensation should preferably comprise the steps of:

a) forming transformation range information in accordance with the first correspondence relationship and the second correspondence relationship, and b) transforming the signals, which have been obtained from the chromatic adaptation transformation or the direct transformation, in accordance with the transformation range information and at a stage between the step of the chromatic adaptation transformation and the step of the inverse transformation or at a stage between the step of the direct transformation and the step of the chromatic adaptation transformation.

Further, in the second method of forming a color transformation look-up table in accordance with the present invention, the transformation range information should preferably be the same transformation range information that the first method of forming a color transformation look-up table for the transformation of the image signals for the non-self-luminous displaying medium into the image signals for the self-luminous displaying medium utilizes.

Furthermore, in the second method of forming a color transformation look-up table in accordance with the present invention, the first correspondence relationship should preferably be calculated with a technique for estimating signals outside a color reproduction range and with an inverse transformation operation, which utilizes a Newton-Raphson technique.

The present invention also provides a second apparatus for forming a color transformation look-up table, in which the second color transformation look-up table is formed with the second method of forming a color transformation look-up table in accordance with the present invention, the apparatus comprising:

i) means for calculating a first correspondence relationship for transformation of color signals, which are capable of being reproduced on the self-luminous displaying medium, from first colorimetric system signals into second colorimetric system signals, ii) means for calculating a second correspondence relationship for transformation of color signals, which are capable of being reproduced on the non-self-luminous displaying medium, from the second calorimetric system signals into the first calorimetric system signals, iii) a dynamic range compensating means for carrying out dynamic range compensation for transforming the dynamic range of the color signals, which are capable of being reproduced on the self-luminous displaying medium, into the dynamic range of the color signals, which are capable of being reproduced on the non-self-luminous displaying medium, in accordance with the first correspondence relationship and the second correspondence relationship, the transformation being carried out for the respective color signals, which are capable of being reproduced on the self-luminous displaying medium, iv) a color transforming means for carrying out color transformation for transforming the color signals, which are capable of being reproduced on the self-luminous displaying medium, into the color signals, which are capable of being reproduced on the non-self-luminous displaying medium, in accordance with the chromatic adaptation model such that the appearances of perceived colors may become identical between the image displayed on the non-self-luminous displaying medium and the image displayed on the self-luminous displaying medium, and v) a storage means for storing the color signals, which are capable of being reproduced on the self-luminous displaying medium, and the corresponding color signals capable of being reproduced on the non-self-luminous displaying medium, which have been obtained from the dynamic range compensation and the color transformation.

In the second apparatus for forming a color transformation look-up table in accordance with the present invention, the color transforming means should preferably comprise:

a) a direct transformation means for carrying out direct transformation of the first colorimetric system signals of the color signals, which are capable of being reproduced on the self-luminous displaying medium, into the second colorimetric system signals, the direct transformation being carried out in accordance with the first correspondence relationship, b) a chromatic adaptation transformation means for carrying out chromatic adaptation transformation in accordance with the chromatic adaptation model on the second calorimetric system signals, which have been obtained from the direct transformation, and c) an inverse transformation means for carrying out inverse transformation of the signals, which have been obtained from the chromatic adaptation transformation, into the first calorimetric system signals, the inverse transformation being carried out in accordance with the second correspondence relationship.

Also, in the second apparatus for forming a color transformation look-up table in accordance with the present invention, the dynamic range compensating means should preferably comprise a transformation range information forming means for forming transformation range information in accordance with the first correspondence relationship and the second correspondence relationship, and the dynamic range compensating means should preferably be means for transforming the signals, which have been obtained from the chromatic adaptation transformation or the direct transformation, in accordance with the transformation range information and at a stage between the step of the chromatic adaptation transformation and the step of the inverse transformation or at a stage between the step of the direct transformation and the step of the chromatic adaptation transformation.

Further, in the second apparatus for forming a color transformation look-up table in accordance with the present invention, the transformation range information forming means should preferably also serve as the transformation range information forming means in the first apparatus for forming a color transformation look-up table for the transformation of the image signals for the non-self-luminous displaying medium into the image signals for the self-luminous displaying medium, and the transformation range information should preferably be the same transformation range information that the first method of forming a color transformation look-up table for the transformation of the image signals for the non-self-luminous displaying medium into the image signals for the self-luminous displaying medium utilizes.

Furthermore, in the second apparatus for forming a color transformation look-up table in accordance with the present invention, the means for calculating the first correspondence relationship should preferably comprise means for estimating signals outside a color reproduction range and an inverse transformation operation means, which utilizes a Newton-Raphson technique.

The present invention further provides a second method of transforming colors of an image, which comprises carrying out inverse transformation of image signals for a self-luminous displaying medium into image signals for a non-self-luminous displaying medium by making reference to the aforesaid second color transformation look-up table in accordance with the present invention.

The present invention still further provides a second apparatus for transforming colors of an image, comprising an image signal inverse transformation means for carrying out inverse transformation of image signals for a self-luminous displaying medium into image signals for a non-self-luminous displaying medium by making reference to the aforesaid second color transformation look-up table in accordance with the present invention.

The present invention also provides a third method of transforming colors of an image, comprising the steps of:

i) transforming image signals for a non-self-luminous displaying medium into image signals for a self-luminous displaying medium by making reference to the aforesaid first color transformation look-up table in accordance with the present invention, and ii) carrying out inverse transformation of the image signals for the self-luminous displaying medium, which have been obtained from the transformation, into image signals for the non-self-luminous displaying medium by making reference to the aforesaid second color transformation look-up table in accordance with the present invention.

The present invention further provides a third apparatus for transforming colors of an image, comprising:

i) an image signal transforming means for transforming image signals for a non-self-luminous displaying medium into image signals for a self-luminous displaying medium by making reference to the aforesaid first color transformation look-up table in accordance with the present invention, and ii) an image signal inverse transformation means for carrying out inverse transformation of the image signals for the self-luminous displaying medium, which have been obtained from the transformation carried out by the image signal transforming means, into image signals for the non-self-luminous displaying medium by making reference to the aforesaid second color transformation look-up table in accordance with the present invention.

With the color transformation look-up tables in accordance with the present invention, the signal transformation of the image signals for the non-self-luminous displaying medium (e.g., a print) and the image signals for the self-luminous displaying medium (e.g., a CRT display device) to each other is carried out in accordance with the chromatic adaptation model. Therefore, basically, the signal transformation can be carried out such that color appearances may become identical between the image displayed on the non-self-luminous displaying medium and the image displayed on the self-luminous displaying medium. Also, together with the signal transformation according to the chromatic adaptation model, the dynamic range compensation (or the dynamic range inverse compensation) is carried out. Accordingly, even if the dynamic range varies for the non-self-luminous displaying medium and the self-luminous displaying medium, the signal transformation can be carried out such that a wider dynamic range can be utilized efficiently.

The table for the transformation of the image signals for the non-self-luminous displaying medium into the image signals for the self-luminous displaying medium and the table for the transformation of the image signals for the self-luminous displaying medium into the image signals for the non-self-luminous displaying medium can be formed such that the signal transformation can be carried out in accordance with parameters of the same chromatic adaptation model. Also, the dynamic range compensation and the dynamic range inverse compensation can be carried out in accordance with the same transformation range information. Therefore, for example, in cases where the image signals for the print are transformed into the image signals for the CRT display device, and the image signals for the CRT display device having been obtained from the transformation are then returned to the image signals for the print, the signal transformation can be carried out such that the image, which is printed in accordance with the returned image signals for the print, and the image, which is printed in accordance with the original image signals for the print, may have approximately identical color appearances.

In cases where the first correspondence relationship and the second correspondence relationship are calculated for the formation of the aforesaid color transformation look-up tables, the technique for color compensation proposed in Japanese Unexamined Patent Publication No. 10(1998)-173943 may be employed. In such cases, a patch of the image displayed on the non-self-luminous displaying medium and a patch of the image displayed on the self-luminous displaying medium are visually compared with each other by the person, who views the patches, and the color compensation is thereby carried out. Therefore, the colorimetric values can be compensated with respect to a difference in colorimeter, a variation in reproduced image, and the like. Also, the signal transformation is carried out in accordance with the chromatic adaptation model described above. Accordingly, the color transformation look-up table can be formed easily and accurately such that the color appearances may become identical between the images displayed on the non-self-luminous displaying medium and the self-luminous displaying medium. Further, in the color compensation, gradation compensation can be carried out appropriately. Therefore, the problems can be prevented from occurring in that, particularly at a shadow, the gradation is raised or laid flat unnaturally or details become imperceptible due to insufficient gradation.

In cases where the color signals are transformed from the second calorimetric system to the first colorimetric system, the inverse transformation operation, which utilizes the N-R technique proposed by the applicant in Japanese Patent Application No. 7(1995)-156555, may be employed. In such cases, the relationship between the first colorimetric system and the second colorimetric system can be approximately represented by a monotone function. Also, the repeated operation is carried out, and the calculated values are thereby obtained reliably. Therefore, accurate color transformation processing can be carried out. As a result, the color transformation table, which enables accurate color transformation processing to be carried out, can be formed.

Further, the technique for estimating signals outside a color reproduction range, which has been proposed by the applicant in Japanese Unexamined Patent Publication No. 10(1998)-117294, may be employed. In such cases, when the signal transformation is carried out between the image signals representing images having different color reproduction ranges, such as an image on a photograph (the non-self-luminous displaying medium), which is formed with a printer, and an image displayed on a CRT display device (the self-luminous displaying medium), the problems can be prevented from occurring in that, even at regions in the vicinity of the boundary of the color reproduction range, an unnatural feeling or a large variation may not occur in colors of the image, which is reproduced and displayed in accordance with the image signals after being transformed. (Specifically, the signal transformation can be carried out such that no failure may occur in the image.) In this manner, for example, the image signals expressed with the XYZ calorimetric system can be accurately transformed into the image signals expressed with the RGB calorimetric system.

In cases where the apparatus for carrying out the signal transformation is constituted such that, for example, the transformation between the image signals for a printed image and the image signals for an image displayed on a CRT display device may be carried out by making reference to the color transformation look-up table described above, the constitution of the apparatus, which carries out the signal transformation such that the color appearances may become identical between the two images, can be kept simple. In such cases, as described above, even if, for example, the image signals for the printed image are transformed into the image signals for the image displayed on the CRT display device and the transformed image signals for the image displayed on the CRT display device are then transformed into the image signals for the printed image, no failure in image signal will occur.

BRIEF DESCRIPTION OF THE DRAWINGS

FIG. 7 is an explanatory view showing RGB signals, FIG. 12A is an explanatory graph showing how compression processing is carried out, FIG. 12B is an explanatory graph showing how clipping processing is carried out, and FIG. 13 is a flow chart showing how a transformation range of a dynamic range is calculated.

DESCRIPTION OF THE PREFERRED EMBODIMENTS

The present invention will hereinbelow be described in further detail with reference to the accompanying drawings.

Figure 1:
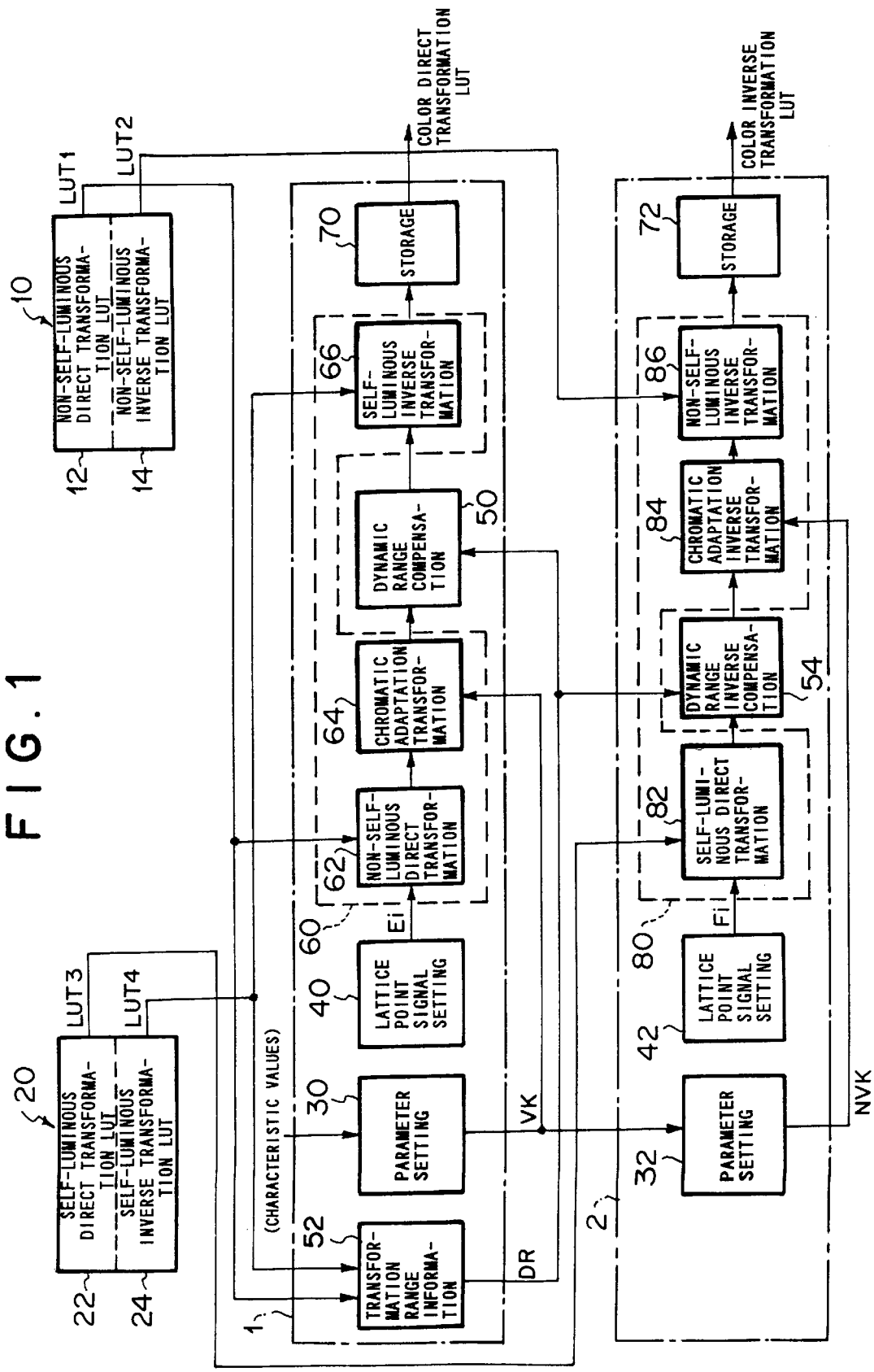
FIG. 1 is a schematic block diagram showing an embodiment of the color transformation table forming apparatus in accordance with the present invention.

FIG. 1 shows an embodiment of the color transformation table forming apparatus in accordance with the present invention. The embodiment includes a color direct transformation table forming apparatus and a color inverse transformation table forming apparatus. In this embodiment, a single device for calculating a non-self-luminous direct transformation relationship, a single device for self-luminous inverse transformation relationship, and a single transformation range information forming device are utilized for both of the color direct transformation table forming apparatus and the color inverse transformation table forming apparatus. Firstly, the constitution of the color transformation table forming apparatus will hereinbelow be described briefly. In this embodiment, a table, which is utilized for the transformation of image signals for a non-self-luminous displaying medium into image signals for a self-luminous displaying medium, is referred to as the color direct transformation table. Also, a table, which is utilized for the transformation of image signals for a self-luminous displaying medium into image signals for a non-self-luminous displaying medium, is referred to as the color inverse transformation table.

The color transformation table forming apparatus shown in FIG. 1 comprises a non-self-luminous transformation LUT forming device 10, a self-luminous transformation LUT forming device 20, a major part 1 of the color direct transformation table forming apparatus, and a major part 2 of the color inverse transformation table forming apparatus.

The non-self-luminous transformation LUT forming device 10 (shown at an upper right stage in FIG. 1) includes a non-self-luminous direct transformation LUT forming device) 12 for calculating a non-self-luminous direct transformation relationship that represents a correspondence relationship for the transformation of image signals for the non-self-luminous displaying medium (not shown), such as printed matter formed with a digital printer, which image signals are expressed with the RGB form, from signals of a first calorimetric system (the RGB colorimetric system) to signals of a second calorimetric system (the XYZ colorimetric system). The non-self-luminous transformation LUT forming device 10 also includes a non-self-luminous inverse transformation LUT forming device) 14 for calculating a non-self-luminous inverse transformation relationship that represents a correspondence relationship for the inverse transformation of the image signals for the non-self-luminous displaying medium from the signals of the XYZ colorimetric system to the signals of the RGB colorimetric system.

The self-luminous transformation LUT forming device 20 (shown at an upper left stage in FIG. 1) includes a self-luminous direct transformation LUT forming device) 22 for calculating a self-luminous direct transformation relationship that represents a correspondence relationship for the transformation of image signals for the self-luminous displaying medium (not shown), such as a CRT display device, which image signals are expressed with the RGB form, from signals of the RGB colorimetric system to signals of the XYZ colorimetric system. The self-luminous transformation LUT forming device 20 also comprising a self-luminous inverse transformation LUT forming device) 24 for calculating a self-luminous inverse transformation relationship that represents a correspondence relationship for the inverse transformation of the image signals for the self-luminous displaying medium from the signals of the XYZ calorimetric system to the signals of the RGB colorimetric system. In lieu of the self-luminous direct transformation LUT and the self-luminous inverse transformation LUT, mathematical formulas, which represent the correspondence relationships for signal transformation, may be utilized directly.

The major part 1 of the color direct transformation table forming apparatus (shown at a middle stage in FIG. 1) includes a parameter setting device 30, which receives information representing characteristic values of the non-self-luminous displaying medium, and the like, carries out a Von Kries's matrix calculation described later, and thereby sets parameters representing the degree of chromatic adaptation of the chromatic adaptation model of the non-self-luminous displaying medium. The major part 1 also device a lattice point signal setting device 40, which sets the signals of the RGB colorimetric system as lattice point signals Ei in the manner described later and in accordance with a color chart subjected to colorimetry. The major part 1 further comprises a dynamic range compensating means 50 for carrying out dynamic range compensation for transforming the dynamic range of color signals, which are capable of being reproduced on the non-self-luminous displaying medium, into the dynamic range of color signals, which are capable of being reproduced on the self-luminous displaying medium, in accordance with the non-self-luminous direct transformation relationship and the self-luminous inverse transformation relationship, the transformation being carried out for the respective lattice point signals Ei, which have been set by the lattice point signal setting device 40. The major part 1 still further includes a color transforming device 60 for carrying out color transformation for transforming the image signals for the non-self-luminous displaying medium into the image signals for the self-luminous displaying medium in accordance with the chromatic adaptation model such that the appearances of perceived colors may become identical between the image displayed on the self-luminous displaying medium and the image displayed on the non-self-luminous displaying medium, the transformation being carried out in accordance with the parameters, which have been set by the parameter setting device 30, and for the respective lattice point signals Ei, which have been set. The major part 1 also comprises a storage device 70 for storing the respective lattice point signals Ei, which have been set, and the corresponding image signals, which have been obtained from the dynamic range compensation and the color transformation.

The major part 2 of the color inverse transformation table forming apparatus (shown at a lower stage in FIG. 1) includes a parameter setting device 32. The parameter setting device 32 receives information representing the parameters, which have been set in the major part 1 of the color direct transformation table forming apparatus and represent the degree of chromatic adaptation of the chromatic adaptation model of the non-self-luminous displaying medium. The parameter setting device 32 also carries out a calculation of inverse parameters of the aforesaid parameters (in this case, a calculation of a Von Kries's inverse matrix). The major part 2 also includes a lattice point signal setting device 42, which sets the signals of the RGB calorimetric system as lattice point signals Fi in the manner described later and in accordance with a color chart subjected to colorimetry. The major part 2 further includes a dynamic range inverse compensation device 54 for carrying out dynamic range inverse compensation for transforming the dynamic range of color signals, which are capable of being reproduced on the self-luminous displaying medium, into the dynamic range of color signals, which are capable of being reproduced on the non-self-luminous displaying medium, in accordance with the self-luminous direct transformation relationship and the non-self-luminous inverse transformation relationship, the transformation being carried out for the respective lattice point signals Fi, which have been set by the lattice point signal setting device 42. The major part 2 still further comprises a color inverse transformation device 80 for carrying out color inverse transformation for transforming the image signals for the self-luminous displaying medium into the image signals for the non-self-luminous displaying medium in accordance with the chromatic adaptation model such that the appearances of perceived colors may become identical between the image displayed on the self-luminous displaying medium and the image displayed on the non-self-luminous displaying medium, the transformation being carried out in accordance with the inverse parameters, which have been set by the parameter setting device 32, and for the respective lattice point signals Fi, which have been set. The major part 2 also comprises a storage device 72 for storing the respective lattice point signals Fi, which have been set, and the corresponding image signals, which have been obtained from the dynamic range inverse compensation and the color inverse transformation.

As in the parameter setting device 30 of the major part 1 of the color direct transformation table forming apparatus, the parameter setting means 32 may alternatively be constituted such that it may receive the information representing the characteristic values of the non-self-luminous displaying medium, and the like, and sets the inverse parameters described above.

The color transforming device 60 comprises a non-self-luminous direct transformation device 62 for transforming the signals of the RGB calorimetric system, which have been set as the lattice point signals Ei, into the signals of the XYZ calorimetric system in accordance with the non-self-luminous direct transformation relationship, which has been calculated by the non-self-luminous direct transformation LUT forming device 12. The color transforming device 60 also comprises a chromatic adaptation transformation device 64 for carrying out chromatic adaptation transformation in accordance with the chromatic adaptation model on the signals of the XYZ calorimetric system, which have been obtained from the non-self-luminous direct transformation device 62, and in accordance with the parameters, which have been set by the parameter setting means 30. The color transforming device 60 further includes a self-luminous inverse transformation device 66 for carrying out inverse transformation of the signals (i.e., the signals of the XYZ calorimetric system), which have been obtained from the chromatic adaptation transformation, into the image signals of the RGB calorimetric system in accordance with the self-luminous inverse transformation relationship, which has been calculated by the self-luminous inverse transformation LUT forming device 24.

The color inverse transformation device 80 comprises a self-luminous direct transformation device 82 for transforming the signals of the RGB colorimetric system, which have been set as the lattice point signals Fi, into the signals of the XYZ colorimetric system in accordance with the self-luminous direct transformation relationship, which has been calculated by the self-luminous direct transformation LUT forming device 22. The color inverse transformation device 80 also includes a chromatic adaptation inverse transformation device 84 for carrying out chromatic adaptation inverse transformation in accordance with the chromatic adaptation model on the signals of the XYZ colorimetric system, which have been obtained from the self-luminous direct transformation device 82, and in accordance with the parameters, which have been set by the parameter setting device 32. The color inverse transformation device 80 further includes a non-self-luminous inverse transformation device 86 for carrying out inverse transformation of the signals, which have been obtained from the chromatic adaptation inverse transformation, into the image signals of the RGB colorimetric system in accordance with the non-self-luminous inverse transformation relationship, which has been calculated by the non-self-luminous inverse transformation LUT forming device 14.

The dynamic range compensating device 50 is provided with a transformation range information forming device 52, which forms transformation range information DR in accordance with the non-self-luminous direct transformation relationship and the self-luminous inverse transformation relationship. The dynamic range compensating device 50 is located between the chromatic adaptation transformation device 64 and the self-luminous inverse transformation means 66 and carries out signal transformation of the signals, which have been obtained from the chromatic adaptation transformation, in accordance with the transformation range information DR. Alternatively, the dynamic range compensating device 50 may be located between the non-self-luminous direct transformation device 62 and the chromatic adaptation transformation device 64.

The dynamic range inverse compensation device 54 is located between the self-luminous direct transformation device 82 and the chromatic adaptation inverse transformation device 84 and carries out signal transformation of the signals, which have been transformed into the signals of the XYZ colorimetric system, in accordance with the transformation range information DR. As the transformation range information forming device, the dynamic range inverse compensation device 54 utilizes the transformation range information forming device 52 of the aforesaid dynamic range compensating device 50. Alternatively, the dynamic range inverse compensation device 54 may be provided with an independent transformation range information forming unit, which forms the same transformation range information DR. Also, the dynamic range inverse compensation device 54 may be located between the chromatic adaptation inverse transformation device 84 and the non-self-luminous inverse transformation device 86.

In the color transformation table forming apparatus described above, the color direct transformation table forming apparatus is constituted of the non-self-luminous direct transformation LUT forming device 12 of the non-self-luminous transformation LUT forming device 10, the self-luminous inverse transformation LUT forming device 24 of the self-luminous transformation LUT forming device 20, and the major part 1 of the color direct transformation table forming apparatus. Also, the color inverse transformation table forming apparatus is constituted of the non-self-luminous inverse transformation LUT forming device 14 of the non-self-luminous transformation LUT forming device 10, the self-luminous direct transformation LUT forming device 22 of the self-luminous transformation LUT forming device 20, the transformation range information forming device 52 which is utilized also for the color direct transformation table forming apparatus, and the major part 2 of the color inverse transformation table forming apparatus.

Figure 5:
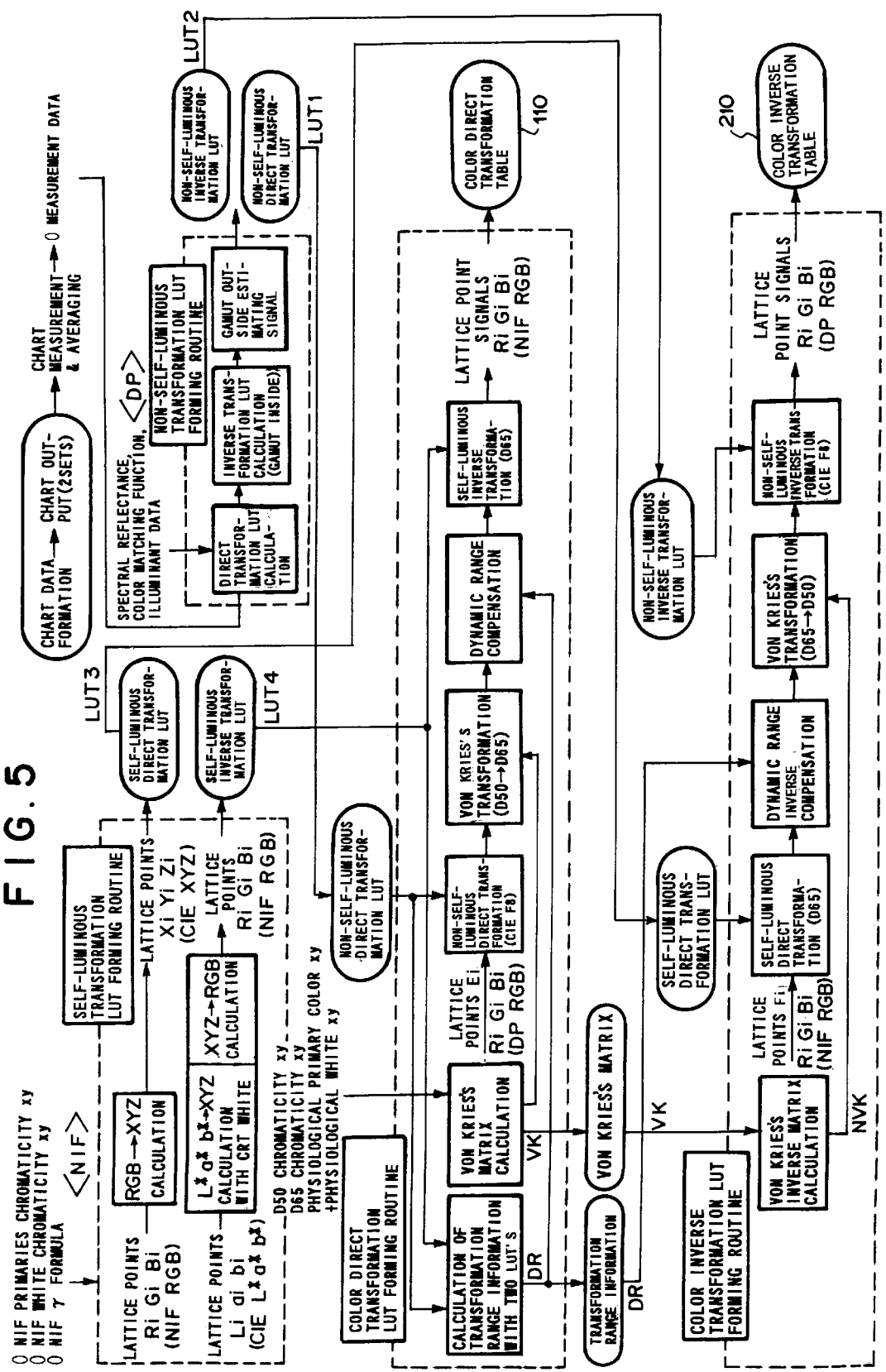
FIG. 5 is an explanatory block diagram showing a color transformation table forming method employed in the color transformation table forming apparatus of FIG. 1.

FIG. 5 shows a color transformation table forming method employed in the color transformation table forming apparatus of FIG. 1. Functions of the color direct transformation table forming apparatus and the color inverse transformation table forming apparatus will be described hereinbelow with reference to FIG. 5. Firstly, how a color direct transformation table 110 is formed by the color direct transformation table forming apparatus will be described hereinbelow.

In this embodiment, an NIFCRT, which is defined with a FlashPix format, is employed as the self-luminous displaying medium, and a digital printer (hereinbelow referred to as the DP) is employed as the non-self-luminous displaying medium. The viewing conditions of the NIFCRT are as shown below.

Viewing flare: 1.0%

Image surround: Average (equivalent to the gray having a reflectivity of 20%)

Luminance: 80 cd/m$^2$

Adaptive white: x=0.3127, y=0.3290 (D65)

The viewing conditions of the DP are as shown below.

Viewing flare: 0.5% to 1.0%

Image surround: Average (equivalent to the gray having a reflectivity of 20%)

Luminance: 160 cd/m$^2$ to 640 cd/m$^2$

Adaptive white: x=0.3457, y=0.3585 (D50)

Therefore, as for the DP, a CIE F8 fluorescent lamp is employed as the illuminant, and the environment of 160 cd/m$^2$ to 640 cd/m$^2$ is assumed.

Figure 2:
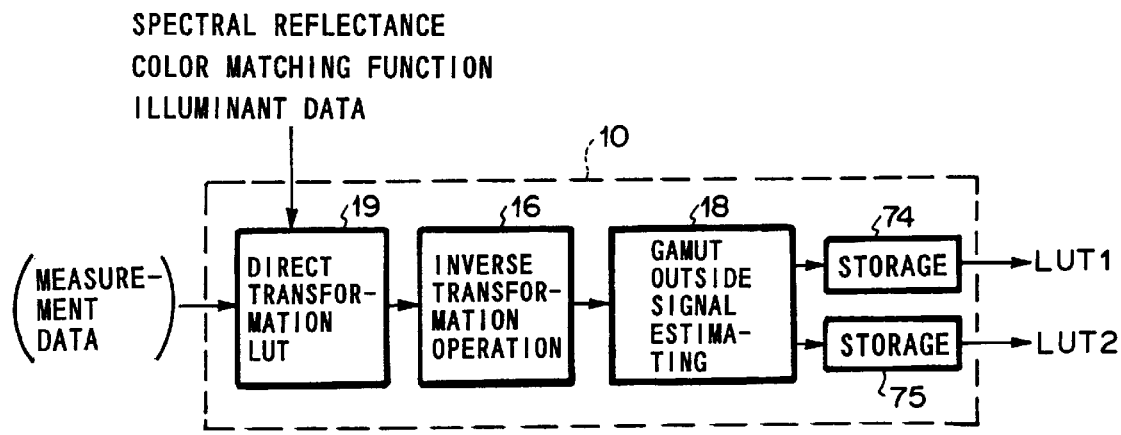
FIG. 2 is a detailed block diagram showing a process for calculating a non-self-luminous direct transformation relationship and a process for calculating a non-self-luminous inverse transformation relationship, which constitute the color transformation table forming apparatus of FIG. 1.

Firstly, how the non-self-luminous direct transformation LUT forming device 12 and the non-self-luminous inverse transformation LUT forming device 14 operate will be described hereinbelow. (The combination of the two device 12 and 14 will hereinbelow be referred to as the non-self-luminous transformation LUT forming device 10.) As illustrated in FIG. 2 in detail, the non-self-luminous transformation LUT forming device 10 comprises an inverse transformation operation device 16 which utilizes the N-R technique, a Gamut outside signal estimating device 18, a direct transformation LUT forming device 19, and storage device 74, 75. With respect to the image signals for the DP, the non-self-luminous transformation LUT forming device 10 calculates the direct transformation relationship for the transformation from the RGB signal to the XYZ signals and the inverse transformation relationship for the transformation from the XYZ signals to the RGB signals. Pieces of information representing the calculated transformation relationships are stored as the LUT's in the storage device 74 and 75.

If the adaptive white points of the DP image (the print) and the NIFCRT image are identical with each other, the calorimetric values of the two images will coincide with each other, and the color appearances will be identical between the two images. However, the image reproduction system and the color reproduction range vary for the DP image and the NIFCRT image. Therefore, if the chromatic adaptation is not taken into consideration, color appearances cannot become identical between the two images. Accordingly, in this embodiment, a transformation relationship for matching the calorimetric values without the chromatic adaptation being taken into consideration is firstly formed, and thereafter a transformation relationship with the chromatic adaptation being taken into consideration is calculated in accordance with the firstly formed relationship.

Specifically, in the non-self-luminous transformation LUT forming device 10, basically, a table may be formed, which represents what colorimetric values of the XYZ calorimetric system are obtained when the respective RGB values are given as the image signals. Also, a table may be formed, which represents what signal values of the RGB colorimetric system are obtained when the signals of the XYZ colorimetric system are given. In order for such a table to be formed, chart data expressed with the RGB calorimetric system may firstly be formed, and color patches may be printed in accordance with the chart data. Thereafter, each of the patches may be measured with a colorimeter, and reflected light distribution data of the patch may be obtained. When necessary, the measurement may be carried out several times, and a mean value of the measured values may be calculated.

By use of the spectral distribution of the thus measured reflected light distribution data, the color matching functions, and the spectral distribution of the illuminant, the direct transformation relationship for the transformation from the signals of the RGB calorimetric system (hereinbelow referred to as the RGB signals) into the signals of the XYZ calorimetric system (hereinbelow referred to as the XYZ signals) is calculated. By use of the results of the calculation, the inverse transformation relationship for the transformation from the XYZ signals into the RGB signals is calculated. In making the calculation, in order to carry out the transformation processing accurately, the technique for carrying out the inverse transformation operation with the N-R technique, which is proposed by the applicant in Japanese Patent Application No. 7 (1995)-156555, should preferably be employed. Details of the calculation will be described hereinbelow.

Firstly, the XYZ signals are calculated from the spectral distribution of the color patch and the spectral distribution of the illuminant, which have been obtained in the manner described above. The XYZ signals can be derived from Formulas (1), (2), and (3) shown below.

$$x = K \int_{380}^{780} s(\lambda)\rho(\lambda)x(\lambda)d\lambda \quad (1)$$

$$Y = K \int_{380}^{780} s(\lambda)\rho(\lambda)y(\lambda)d\lambda \quad (2)$$

$$Z = K \int_{380}^{780} s(\lambda)\rho(\lambda)z(\lambda)d\lambda \quad (3)$$

wherein S($\lambda$) represents the spectral distribution of the illuminant ($\lambda$ is the wavelength of light), $\rho(\lambda)$ represents the spectral reflectance distribution of the object, each of x($\lambda$), y($\lambda$), and z($\lambda$) represents the color matching function with respect to the human eyes, and the wavelength range of the visible light is set to be 380 nm to 780 nm. The normalization coefficient K is represented by Formula (4) shown below.

$$K = 100 \bigg/ \int_{380}^{780} s(\lambda)y(\lambda)d\lambda \qquad (4)$$

As illustrated in FIG. 7, when the minimum density and the maximum density of the color patches of each of the R, G, and B colors are normalized to be 0 and 255, respectively, and the range of 0 to 255 is divided into eight stages, 512 (=8×8×8) color patches are obtained. Also, values of the portions other than the measuring points at the lattice points in the color patches shown in FIG. 7 may be calculated with interpolating operations. In this manner, a non-self-luminous direct transformation table LUT1, which represents the relationship of the XYZ signals corresponding to the RGB signals of each color patch, can be obtained.

Secondly, the procedure for forming a non-self-luminous inverse transformation table LUT2 with the N-R technique and in accordance with the non-self-luminous direct transformation table LUT1 will be described hereinbelow.

Figure 8B:
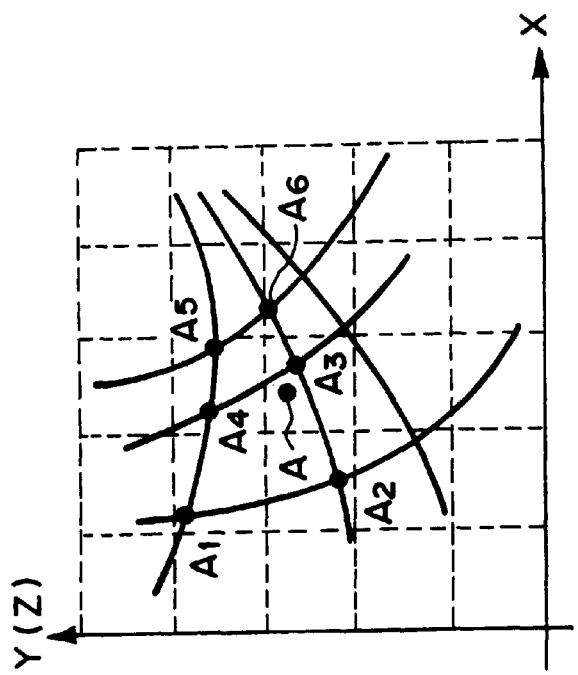
FIGS. 8A and 8B are explanatory views showing a relationship of transformation between an RGB space and an XYZ space.
Figure 8A:
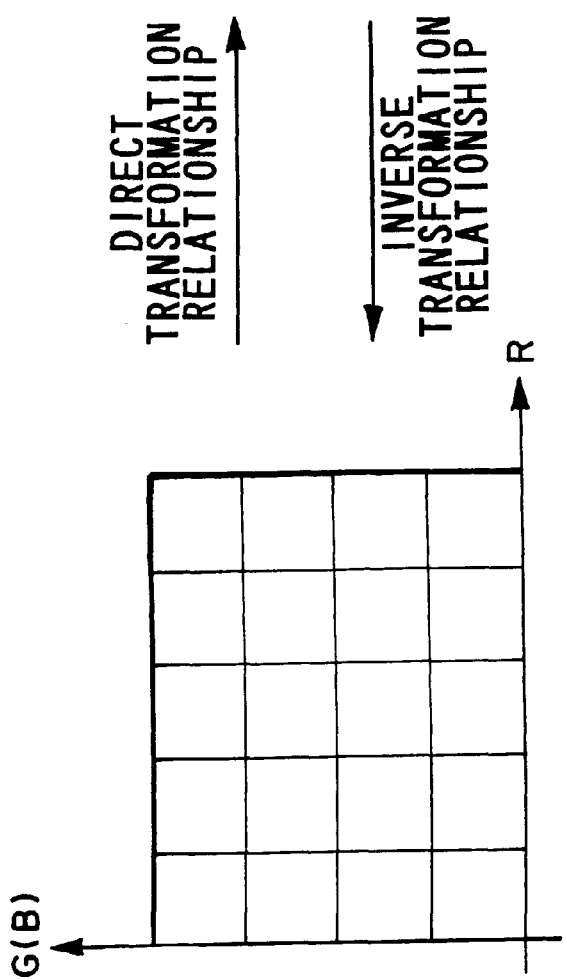

The relationship between the non-self-luminous direct transformation table LUT1 and the non-self-luminous inverse transformation table LUT2 will be described hereinbelow with reference to FIGS. 8A and 8B. In FIG. 8A, as an aid in facilitating the explanation, the RGB signals constituting the RGB color patches are expressed in a two-dimensional form. The respective RGB signals correspond to equally spaced lattice points. In FIG. 8B, as an aid in facilitating the explanation, the XYZ signals, which are obtained by carrying out colorimetry with respect to the RGB signals at the lattice points, are expressed in a two-dimensional form. As illustrated in FIG. 8B, the thus obtained XYZ signals are located at markedly irregular lattice intervals. The non-self-luminous direct transformation table LUT1 serves to calculate the XYZ signals corresponding to arbitrary RGB signals in the relationship shown in FIG. 8A. The non-self-luminous direct transformation table LUT1 serves to calculate the RGB signals corresponding to arbitrary XYZ signals in the relationship shown in FIG. 8B. In such cases, for example, when the RGB signals corresponding to the XYZ signals at a point A are calculated, an interpolating operation should be carried out by using the RGB signals at points A1, A2, A3, and A4. However, in such cases, there is the risk that the interpolating operation will be carried out by using the RGB signals at points A3, A4, A5, and A6, which are close to the point A. In this embodiment, the relationship among three variables through fixation of the RGB signals is employed, and the non-self-luminous inverse transformation table LUT2 is formed by using the repeated operation technique.

As illustrated in FIG. 7, the RGB color space is constituted of the RGB signals, which are arrayed in the lattice-like form. Therefore, the XYZ signals corresponding to the arbitrary RGB signals can be calculated with the interpolating operation by using the non-self-luminous direct transformation table LUT1. On the other hand, as illustrated in FIG. 8B, the XYZ space, which is obtained from the RGB space, takes on the distorted form. Therefore, it is difficult to calculate the RGB signals corresponding to the arbitrary XYZ signals. Accordingly, XYZ signals, which are arrayed at regular intervals, are set as indicated by the broken lines in FIG. 8B, and the RGB signals corresponding to the XYZ signals are calculated with the N-R technique. In this manner, the non-self-luminous inverse transformation table LUT2 is formed.

Firstly, target values on the lattice of the XYZ space are set to be (X0, Y0, Z0), and an allowable error in the repeated operations is set to be ΔEmin. Thereafter, already known initial values (R1, G1, B1) in the RGB space are set, and stimulus values (X1, Y1, Z1) corresponding to the initial values (R1, G1, B1) are calculated. Also, the error quantity ΔE between the target values (X0, Y0, Z0) and the stimulus values (X1, Y1, Z1) is calculated and compared with ΔEmin. By way of example, the allowable error ΔEmin may be set as a color difference, which is calculated in accordance with the color difference formula in the L*a*b* colorimetric system. In cases where the condition of |ΔE|<ΔEmin is not satisfied, correction values (ΔR, ΔG, ΔB) are calculated, the initial values (R1, G1, B1) are corrected by the correction values (ΔR, ΔG, ΔB), and the aforesaid processing is then repeated.

Figure 9:
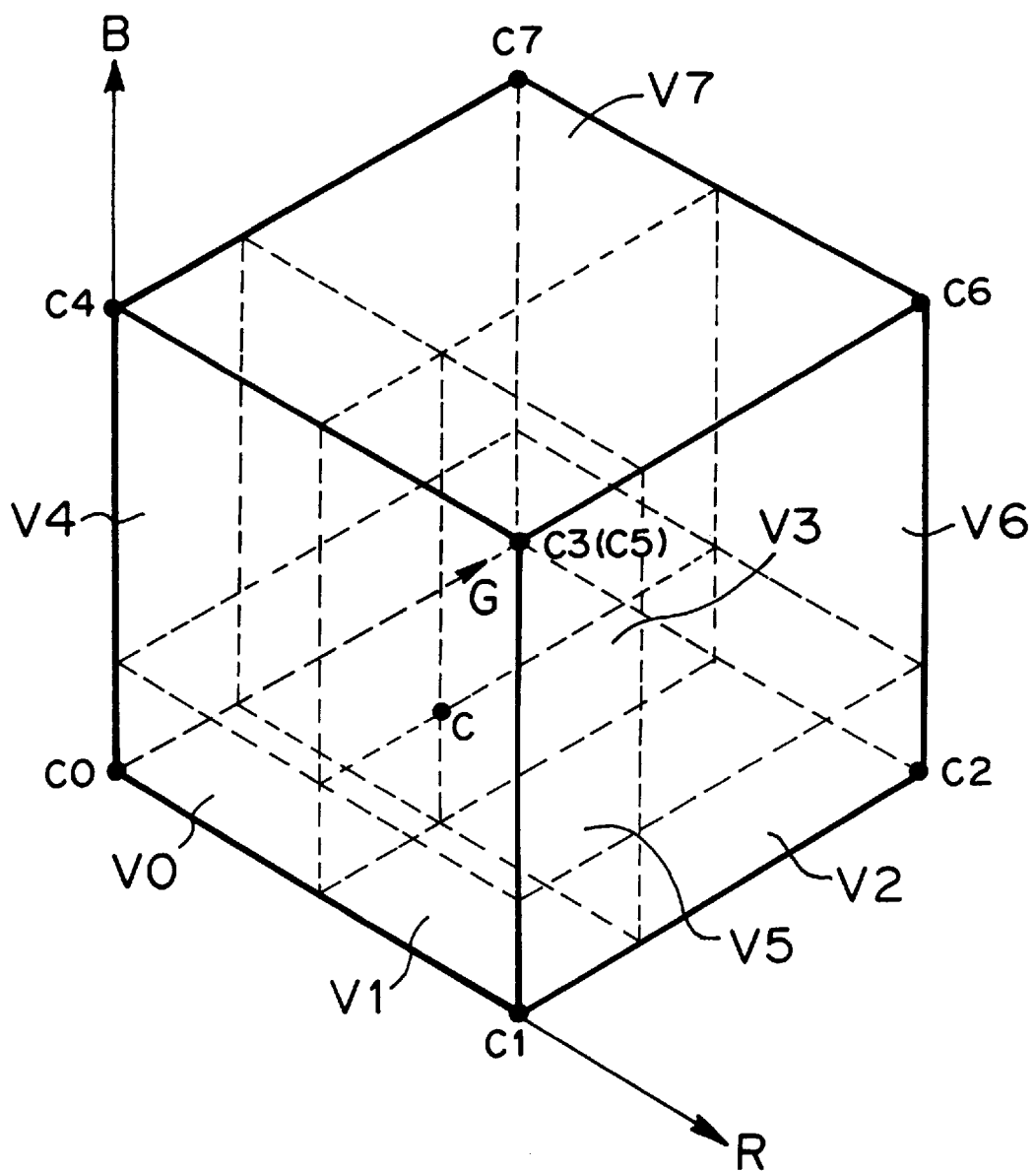
FIG. 9 is an explanatory view showing how volume interpolation is carried out.

The afore said correction values (ΔR, ΔG, ΔB) are calculated in the manner described below. Specifically, as illustrated in FIG. 9, when arbitrary RGB signals are given, the XYZ signals corresponding to the given RGB signals (represented by a point "a") can be calculated by using XYZ signals (x0, y0, z0)≈(x7, y7, z7) corresponding to RGB signals (r0, g0, b0)≈(r7, g7, b7) at eight lattice points c0≈c7, the volume V of the rectangular parallelepiped surrounded by the lattice points c0≈c7, and volumes V0≈V7, which result from division of the rectangular parallelepiped by an arbitrary interpolation point "c" into eight sections. The calculations are made with Formulas (5), (6), and (7) shown below.

$$X = \sum_{j=0}^{7} Vj \cdot Xj/V \qquad (5)$$

$$Y = \sum_{j=0}^{7} Vj \cdot Yj/V \qquad (6)$$

$$Z = \sum_{j=0}^{7} Vj \cdot Zj/V \qquad (7)$$

In the relationships of Formulas (5), (6), and (7), if it is assumed that the XYZ signals corresponding to the RGB signals are sectorial within a minute range, the correction values (ΔR, ΔG, ΔB), which are minute change quantities of the RGB signals, and minute change quantities (ΔX, ΔY, ΔZ) of the XYZ signals will satisfy the relationship of Formula (8) shown below in accordance with the N-R technique.

$$\begin{bmatrix} \Delta X \\ \Delta Y \\ \Delta Z \end{bmatrix} = \begin{bmatrix} \frac{\partial X}{\partial R} & \frac{\partial X}{\partial G} & \frac{\partial X}{\partial B} \\ \frac{\partial Y}{\partial R} & \frac{\partial Y}{\partial G} & \frac{\partial Y}{\partial B} \\ \frac{\partial Z}{\partial R} & \frac{\partial Z}{\partial G} & \frac{\partial Z}{\partial B} \end{bmatrix} \begin{bmatrix} \Delta R \\ \Delta G \\ \Delta B \end{bmatrix} = J \begin{bmatrix} \Delta R \\ \Delta G \\ \Delta B \end{bmatrix} \qquad (8)$$

In Formula (8), J represents the Jacobian matrix. In Formula (8), when the Jacobian matrix J is determined, the minute change quantities (ΔX, ΔY, ΔZ) of the XYZ signals with respect to the correction values (ΔR, ΔG, ΔB) of the RGB signals can be predicted. The Jacobian matrix J can be obtained by partially differentiating Formulas (5), (6), and (7) with the RGB signals. Therefore, the correction values (ΔR, ΔG, ΔB) of the RGB signals can be calculated with Formula (9) shown below.

$$\begin{bmatrix} \Delta R \\ \Delta G \\ \Delta B \end{bmatrix} = J^{-1} \begin{bmatrix} \Delta X \\ \Delta Y \\ \Delta Z \end{bmatrix} \quad (9)$$

Repeated operations may be carried out by using the Jacobian matrix J, which is obtained in the manner described above, and the RGB signals with respect to the arbitrary target values (X0, Y0, Z0) can there by be calculated. The same processing is carried out for all target values on the lattice in the XYZ space, and a first inverse transformation LUT for the transformation of the XYZ signals into the RGB signals is thereby formed.

Figure 10:
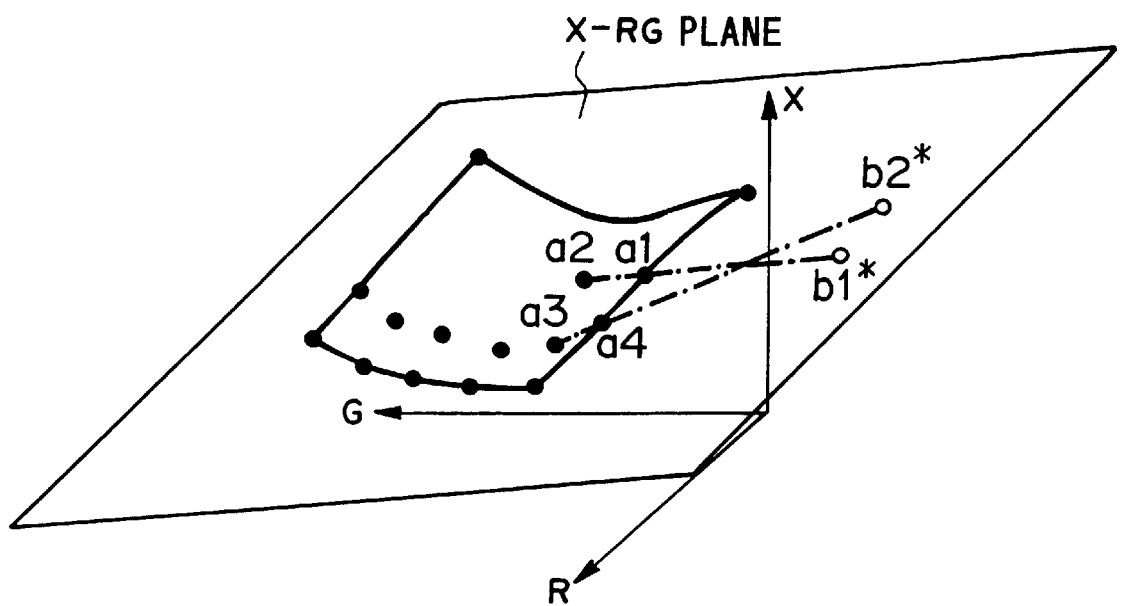
FIG. 10 is an explanatory view showing RGB signals and virtual RGB signals, which are expressed in an X-RG space.

With the N-R technique, it often occurs that the signals fall outside the color reproduction range during the convergent operation. Therefore, it is necessary that the RGB signals are virtually located at sufficiently remote positions outside the color reproduction range. In such cases, in an X-RG space illustrated in FIG. 10, points b1* and b2* may be set on the side outward from the color reproduction range. In such cases, if the points b1* and b2* do not retain the monotone relationship of smooth connection with respect to the relationship of points a1≈a4 within the color reproduction range, the operation will not converge. Therefore, such cases cannot be applied to the processing with the N-R technique.

Accordingly, after the N-R technique has been carried out by using the signals at the points b1* and b2*, such that the points b1*, b2* and the points a1≈a4 may have a monotone relationship, for example, virtual RGB signals RGB* and virtual XYZ signals XYZ* at the point b1* are calculated with the method of least squares by using only the signals at the points a1 and a2, which are close to the point b1*, and virtual RGB signals RGB* and virtual XYZ signals XYZ* at the point b2* are calculated by using only the signals at the points a3 and a4, which are close to the point b2*. Also, the relationship between the RGB signals, including the virtual RGB signals RGB*, and the XYZ signals, including the virtual XYZ signals XYZ*, is set as a second inverse transformation LUT.

Thereafter, virtual XYZ signals XYZ1* are set at a sufficiently remote position on the side outward from the color reproduction range in the second inverse transformation LUT. Also, virtual RGB signals RGB1* corresponding to the virtual XYZ signals XYZ1* are calculated.

In such cases, the virtual RGB signals RGB1* are calculated with the method of least squares by assuming that the relationship between the RGB signals and the XYZ signals has monotoneity. The assumption that the relationship has monotoneity is guaranteed by the fact that the RGB signals decrease monotonously as the XYZ signals increase.

Therefore, four-dimensional planes RGB-X, RGB-Y, and RGB-Z are calculated with the method of least squares by using all signal sets (Ri, Gi, Bi, Xi, Yi, Zi) of the RGB signals and the XYZ signals in the second inverse transformation LUT. In such cases, the four-dimensional planes are defined by Formula (10) shown below.

$$T = A \cdot D \quad (10)$$

Formula (10) represents the relationship of Formula (11) shown below.

$$\begin{bmatrix} X \\ Y \\ Z \end{bmatrix} = \begin{bmatrix} A_{X1} & A_{X2} & A_{X3} & A_{X4} \\ A_{Y1} & A_{Y2} & A_{Y3} & A_{Y4} \\ A_{Z1} & A_{Z2} & A_{Z3} & A_{Z4} \end{bmatrix} \begin{bmatrix} R \\ G \\ B \\ 1 \end{bmatrix} \quad (11)$$

Further, the coefficient A, which satisfies the relationship of Formula (10), is calculated with the method of least squares such that E represented by Formula (12) may become minimum. In Formula (12), "i" represents the number of the color patch, and T represents the transposition of the rows and the columns of the matrix.

$$E = \sum_j (T_i - A \cdot D_i) \cdot (T_i - A \cdot D_i)^T \quad (12)$$

When the coefficient A is calculated with Formula (12) shown above, the four-dimensional planes RGB-X, RGB-Y, and RGB-Z are determined. Thereafter, on the thus obtained four-dimensional planes RGB-X, RGB-Y, and RGB-Z, the virtual XYZ signals XYZ1*, which are located at a position sufficiently spaced from the XYZ signals, and the virtual RGB signals RGB1* corresponding to the virtual XYZ signals XYZ1* are calculated.

Figure 11:
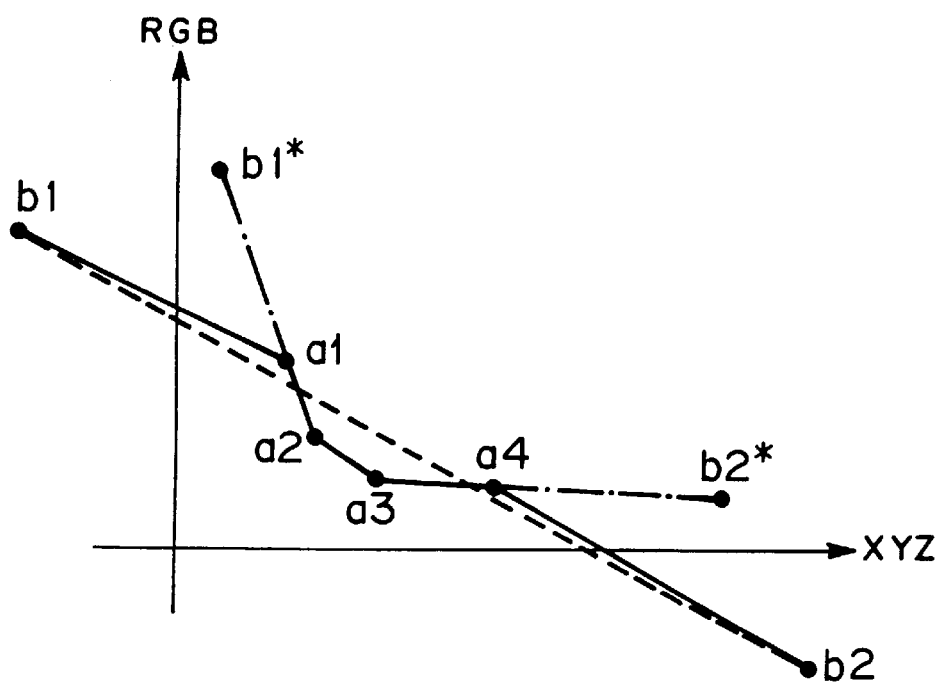
FIG. 11 is an explanatory view showing how virtual color signals are formed with a method of least squares.

FIG. 11 shows the relationship between the XYZ signals, the virtual XYZ signals XYZ1*, and the RGB signals, the virtual RGB signals RGB1* which have been formed in the manner described above, as a two-dimensional profile diagram. Specifically, from the aforesaid findings, the relationship between the XYZ signals and the RGB signals is the monotone decreasing relationship as indicated by, for example, the points a1≈a4. Also, when the four-dimensional plane, which has been calculated with the method of least squares by using the points a1≈a4, is represented by the broken line, the plane connecting points b1, b2, which represent the virtual RGB signals RGB1* corresponding to the virtual XYZ signals XYZ1* on the four-dimensional plane, and the points a1≈a4 has a monotone decreasing relationship as indicated by the solid line. Therefore, in cases where the virtual RGB signals RGB1* with respect to the virtual XYZ signals XYZ1* are formed by using the method of least squares in the manner described above, the monotone relationship can be kept between the RGB signals containing the virtual XYZ signals XYZ1* and the XYZ signals containing the virtual RGB signals RGB1*.

After the virtual RGB signals RGB1* with respect to the virtual XYZ signals XYZ1* have been calculated in the manner described above, a third inverse transformation LUT for the transformation of the RGB signals containing the virtual XYZ signals XYZ1* into the RGB signals containing the virtual RGB signals RGB1* is set.

Further, the thus set third inverse transformation LUT is mapped (with the Gamut mapping) to the reproducible range of the RGB signals on the non-self-luminous displaying medium. As one of the mapping techniques, as indicated by the solid line in FIG. 12A, the RGB signals, including those within the color reproduction range, may be compressed. As another mapping technique, as illustrated in FIG. 12B, the RGB signals within the color reproduction range may be kept unchanged, and all of the RGB signals falling outside the color reproduction range may be clipped at the maximum value or the minimum value. By the carrying out of the mapping processing in this manner, the RGB signals falling outside the color reproduction range can be transformed into the RGB signals falling within the color reproduction range. Also, by the carrying out of the mapping of the third inverse transformation LUT in this manner, the non-self-luminous inverse transformation table LUT2 can be obtained.

As described above, the lattice points in the non-self-luminous direct transformation table LUT1 are the RGB points and, in order for a high transformation accurately to be obtained, the values corresponding to the lattice points should preferably be transformed into the XYZ values. The lattice points in the non-self-luminous inverse transformation table LUT2 should preferably be set as the L*a*b* points, instead of the XYZ points being set, and the values corresponding to the lattice points should preferably be transformed into the RGB values. This is because, when the signals in the vicinity of the color reproduction range are calculated, a high accuracy can be obtained with the technique for visually estimating the lattice point signals falling outside the color reproduction range. In such cases, white point signals at the time of the transformation of the XYZ signals into the L*a*b* signals or information capable of forming the L*a*b* signals should be added to the non-self-luminous inverse transformation table LUT2.

In the manner described above, with respect to the DP image signals, the direct transformation relationship for the transformation from the RGB signals into the XYZ signals and the inverse transformation relationship for the transformation from the XYZ signals into the RGB signals are obtained. The information representing the direct transformation relationship for the transformation from the RGB signals into the XYZ signals is stored as LUT1 in the storage device 74. The information representing the inverse transformation relationship for the transformation from the XYZ signals into the RGB signals is stored as LUT2 in the storage device 75.

Figure 3:
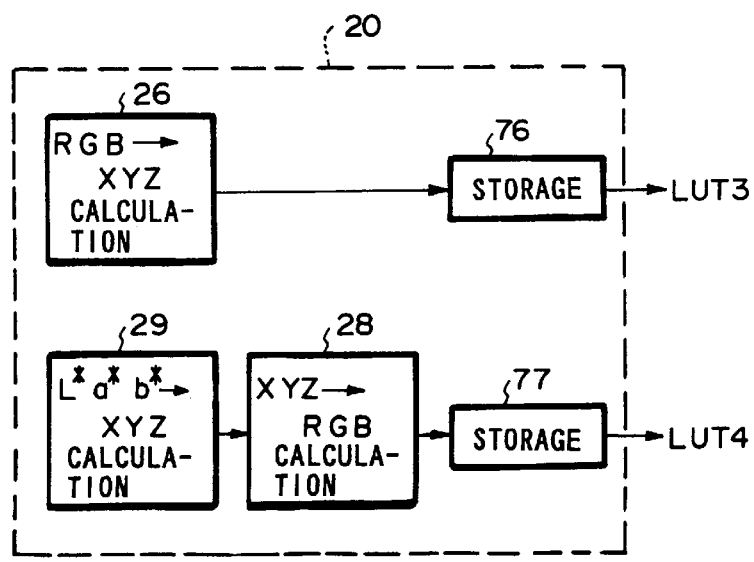
FIG. 3 is a detailed block diagram showing a process for calculating a self-luminous direct transformation relationship and a process for calculating a self-luminous inverse transformation relationship, which constitute the color transformation table forming apparatus of FIG. 1, FIGS. 4A, 4B, 4C, 4D, and 4E are explanatory diagrams showing examples of signal transformation carried out in the color transformation table forming apparatus of FIG. 1.

How the self-luminous direct transformation LUT forming device 22 and the self-luminous inverse transformation LUT forming device 24 operate will be described hereinbelow. (The combination of the two device 22 and 24 will hereinbelow be referred to as the self-luminous transformation LUT forming device 20.) As illustrated in detail in FIG. 3, the self-luminous transformation LUT forming device 20 includes a calculation device 26, which makes calculations for the transformation of the RGB signals into the XYZ signals and thereby calculates the direct transformation relationship for the transformation from the RGB signals into the XYZ signals. The self-luminous transformation LUT forming device 20 also includes a calculation device 28, which makes calculations for the transformation of the XYZ signals into the RGB signals and thereby calculates the inverse transformation relationship for the transformation from the XYZ signals into the RGB signals. The self-luminous transformation LUT forming device 20 further includes a calculation device 29, which makes calculations for the transformation of the L*a*b* signals into the XYZ signals and thereby calculates the transformation relationship for the transformation from the L*a*b* signals into the XYZ signals. Pieces of information representing the calculated transformation relationships are stored as the LUT's in storage device 76 and 77. (Reference should be made to the upper left stage in FIG. 5.)

In the self-luminous transformation LUT forming device 20, basically, a table may be formed, which represents what colorimetric values of the XYZ calorimetric system are obtained when the respective RGB values are given as the image signals. Also, a table may be formed, which represents what signal values of the RGB calorimetric system are obtained when the signals of the XYZ calorimetric system are given. As for the NIFCRT, the signal correspondence relationship is defined by predetermined formulas in accordance with the chromaticity of the three primary colors, the chromaticity of the white point, and the γ formula. Therefore, the correspondence relationship of signals can be obtained only from calculations without the NIFCRT image being measured. In this case, instead of the tables being formed, the mathematical formulas representing the correspondence relationship may be utilized directly.

In the cases of the NIFCRT, the LUT's should be set such that the signals falling outside the color reproduction range can be transformed. The calculations for such purposes may be made with the formulas shown below.

$$R'NIF = R(8 \text{ bits})/255.0$$

$$RNIF = \{(R'NIF + 0.055)/1.055\}^{2.4}$$

$$(0.03929 \leq R'NIF)$$

$$RNIF = R'NIF/12.92$$

$$(-0.03929 < R'NIF < 0.03929)$$

$$RNIF = -\{(-R'NIF + 0.055)/1.055\}^{2.4}$$

$$(R'NIF \leq 0.03929)$$

As for GNIF and BNIF, calculations may be made in the same manner as that shown above.

As in the aforesaid non-self-luminous transformation LUT forming device 10, with respect to the NIFCRT image signals, the direct transformation relationship for the transformation from the RGB signals into the XYZ signals and the inverse transformation relationship for the transformation from the XYZ signals into the RGB signals are obtained. The information representing the direct transformation relationship for the transformation from the RGB signals into the XYZ signals is stored as LUT3 in the storage device 76. The information representing the inverse transformation relationship for the transformation from the XYZ signals into the RGB signals is stored as LUT4 in the storage device 77.

In the manner described above, with respect to the DP image signals and the NIFCRT image signals, respectively, the direct transformation tables LUT1, LUT3 for the transformation from the RGB signals into the XYZ signals and the inverse transformation tables LUT2, LUT4 for the transformation from the XYZ signals (the L*a*b* signals) into the RGB signals are obtained. Examples of the obtained LUT's are shown in FIGS. 4A, 4B, 4C, and 4D. With the thus obtained LUT's, the RGB signals for the DP can be transformed into the RGB signals for the NIFCRT such that the colorimetric values may coincide with each other between the DP image and the NIFCRT image.

Figures 4A, 4B, 4C, 4D, 4E:
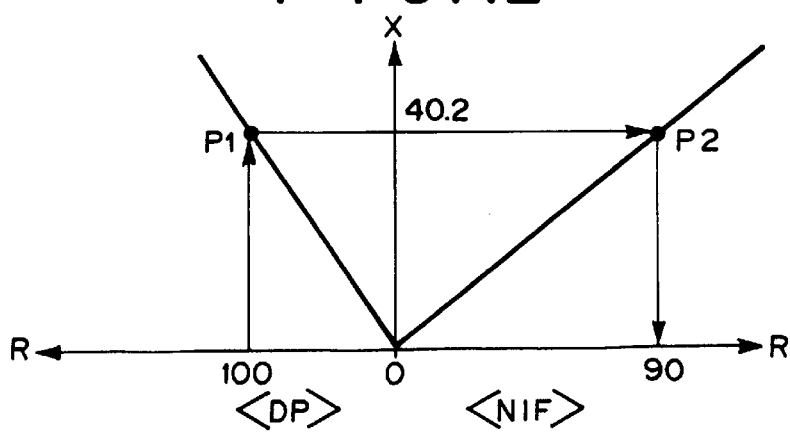

For example, when desired values (Ri, Gi, Bi) are given as the RGB signals for the DP, the values (Xi, Yi, Zi) are calculated by using the non-self-luminous direct transformation table LUT1. Thereafter, when the values (Xi, Yi, Zi) are given, the RGB signals for the NIFCRT are calculated as (RO, GO, BO) by using the self-luminous inverse transformation table LUT4. FIG. 4E is an explanatory graph simply showing an example of the process for transforming the RGB signals for the DP into the RGB signals for the NIFCRT by using the LUT's shown in FIGS. 4A through 4 D. The right half of the graph of FIG. 4E shows the R and X signals in the LUT, which represents the correspondence relationship between the RGB signals and the XYZ signals for the NIFCRT. The left half of the graph of FIG. 4E shows the R and X signals in the LUT, which represents the correspondence relationship between the RGB signals and the XYZ signals for the DP. By way of example, in cases where the R value for the DP is 100, the X value for the DP may be 40.2. In such cases, a point P1 corresponding to such values is plotted on the line in the left half of the graph. Thereafter, a line is drawn horizontally from the plotted point P1 to the right half of the graph, and a point P2, at which the horizontally drawn line intersects with the line in the right half of the graph, is plotted. Also, a line is drawn between the point P2, and the R value for the NIFCRT, which corresponds to the X value of 40.2 for the NIFCRT, is thereby found as being approximately 90. With such a graph, the process for the signal transformation using the aforesaid LUT's would be understood easily. In this case, the interpolating operation is carried out by making reference to FIG. 4E. Actually, as described above, three-dimensional interpolating operations are carried out between lattice points.

As described above, in the foregoing explanation, the chromatic adaptation is not taken into consideration. When the chromatic adaptation is considered, since the white point of the DP and the white point of the NIFCRT are different from each other, even if the colorimetric values expressed with the XYZ colorimetric system are caused to coincide with each other, the color appearances will not become identical between the DP image and the NIFCRT image. Therefore, it becomes necessary to carry out the signal transformation in accordance with the chromatic adaptation model such that the color appearances may become identical between the DP image and the NIFCRT image.

In this embodiment, the Von Kries's chromatic adaptation model is considered. When the Von Kries's chromatic adaptation model is considered, it is necessary for a predetermined matrix calculation to be carried out. In order for the predetermined matrix calculation to be carried out, the parameter setting means 30 is provided. Basically, in the Von Kries's chromatic adaptation model, chromaticity coordinates (x, y, z) of the physiological primary colors of the human eyes (corresponding to the RGB primary colors of the CRT display device) and chromaticity coordinates (x, y, z) of the physiological white (corresponding to the white W of the CRT display device) are inputted as the characteristic values. Also, in this embodiment, the print formed by the DP is viewed under the CIE F8 fluorescent lamp (corresponding to a white point D50), and the white point of the NIFCRT is defined as D65. Therefore, the chromaticity of the white point D50 and the chromaticity of the white point D65 are also inputted as the characteristic values. The Von Kries's matrix calculation is thereby carried out.

Firstly, in cases where the chromaticity of the white point of the print formed by the DP is represented by (Xd50, Yd50, Zd50) and the chromaticity of the white point of the NIFCRT is represented by ((Xd65, Yd65, Zd65), the white points may be transformed into the LMS space with the physiological primary colors in accordance with Formulas (13) and (14) shown below.

$$\begin{bmatrix} L \\ M \\ S \end{bmatrix} = M \begin{bmatrix} Xd50 \\ Yd50 \\ Zd50 \end{bmatrix} \quad (13)$$

$$\begin{bmatrix} L' \\ M' \\ S' \end{bmatrix} = M \begin{bmatrix} Xd65 \\ Yd65 \\ Zd65 \end{bmatrix} \quad (14)$$

In the formulas, (L, M, S) represents the results of the transformation of the chromaticity of the white point of the print into the LMS space with the physiological primary colors. Also, (L', M', S') represents the results of the trans-formation of the chromaticity of the white point of the NIFCRT into the LMS space with the physiological primary colors. The matrix M is determined by the three physiological primary colors of the human eyes and the white point associated with the balance of the physiological primary colors.

The relationship between (L, M, S) and (L', M', S') may be represented by Formula (15) shown below.

$$\begin{bmatrix} L' \\ M' \\ S' \end{bmatrix} = D \begin{bmatrix} L \\ M \\ S \end{bmatrix}$$

wherein $$D = \begin{bmatrix} \frac{Ld65}{Ld50} & 0 & 0 \\ 0 & \frac{Md65}{Md50} & 0 \\ 0 & 0 & \frac{Sd65}{Sd50} \end{bmatrix}$$

Therefore, from Formulas (13), (14), and (15) shown above, the relationship between the chromaticity (Xd50, Yd50, Zd50) of the white point of the print formed by the DP and the chromaticity ((Xd65, Yd65, Zd65) of the white point of the NIFCRT may be represented by Formula (16) shown below.

$$\begin{bmatrix} Xd65 \\ Yd65 \\ Zd65 \end{bmatrix} = M \cdot D \cdot M^{-1} \begin{bmatrix} Xd50 \\ Yd50 \\ Zd50 \end{bmatrix} \quad (16)$$

As for the physiological primary colors of the human eyes, several techniques have been proposed. In this embodiment, a technique, which was proposed by Estevez in 1979, is employed. The chromaticity coordinates of the physiological primary colors and the results of calculations of the transformation matrices to the LMS space, which are obtained when D65 and Se (the equi-energy white) are used for the physiological white, are shown below.

$$L(0.8374 \quad 0.1626)$$
$$M(2.3021 \quad 1.3021)$$
$$S(0.1669 \quad 0.0000)$$

White: D65

$$\begin{bmatrix} 0.40024 & 0.70760 & -0.08081 \\ -0.22630 & 1.16532 & 0.04570 \\ 0.00000 & 0.00000 & 0.981822 \end{bmatrix}$$

White: Se $$\begin{bmatrix} 0.38971 & 0.68898 & -0.07868 \\ -0.22981 & 1.18340 & 0.04641 \\ 0.00000 & 0.00000 & 1.000000 \end{bmatrix}$$

As for the physiological white, in cases where either one of the transformation matrices shown above is used, the matrix $M \cdot D \cdot M^{-1}$ may be represented by Formula (17) shown below.

$$V = M \cdot D \cdot M^{-1} = \begin{bmatrix} 0.9845 & -0.0547 & 0.0678 \\ -0.060 & 1.0048 & 0.0012 \\ 0.0000 & 0.0000 & 1.3200 \end{bmatrix} \quad (17)$$

The transformation with the Von Kries's chromatic adaptation model is carried out by using the thus obtained matrix V. In cases where the transformation is to be carried out in the reverse direction, an inverse matrix $V^{-1}$ of the matrix V is calculated, and the transformation is carried out by using the inverse matrix $V^{-1}$.

The color transformation table forming apparatus in accordance with the present invention is not limited to the use of the Von Kries's chromatic adaptation model, and any of other chromatic adaptation models may be utilized. In such cases, predetermined parameters corresponding to the utilized adaptation model may be set by the parameter setting device 30.

The dynamic range, which the NIFCRT can express, and the dynamic range, which the DP can express, differ from each other. Therefore, the transformation range information forming device 52 makes reference to the non-self-luminous direct transformation table LUT1 and the self-luminous inverse transformation table LUT4 and forms the transformation range information in accordance with what brightness levels the DP and the NIFCRT can express.

In cases where the white ground of the print is taken as the reference white, the dynamic range of the DP is such that the brightness $L^*$=approximately 5 to 100.0. In cases where the white of the CRT display device is taken as the reference white, the dynamic range of the NIFCRT is such that the brightness $L^*$=0.0 to 100.0 as specified by the definition formula. Therefore, when the $L^*a^*b^*$ matching with the $L^*a^*b^*$ model is carried out, the black (R, G, B)=(0, 0, 0) of the print formed by the DP is transformed into (R, G, B)=(15, 16, 21) of the NIFCRT. Actually, when the CRT display device is viewed in a dark room, the black of the CRT display device has a certain level of brightness due to a dark current of the CRT display device. Also, in the viewing environment of the NIFCRT, 1% of the CRT's white is reflected from the tube surface. Therefore, brightness of approximately $L^*$=9 is possessed. Accordingly, actually, it is necessary for the black of the NIFCRT to be set to be lower than (0, 0, 0). For such purposes, besides the use of the defined NIFCRT formula, processing should be carried out such that the entire dynamic range of the CRT display device can be utilized as much as possible.

Since the aforesaid Von Kries's chromatic adaptation model is used, the white (R, G, B)=(255, 255, 255) of the print formed by the DP is reliably transformed into the white (R, G, B)=(255, 255, 255) of the NIFCRT. Therefore, as for the white in the dynamic range, no problems occur. Effects of tube surface reflection of the CRT display device bring about visual changes such that the black may float and the gradation at the shadow alone may become laid flat. Therefore, processing for raising the gradation is carried out such that the entire dynamic range of the CRT display device can be utilized as much as possible. FIG. 13 shows the calculations of the transformation range of the dynamic range for raising the gradation. Firstly, in a step S1, the black (R, G, B)=(0, 0, 0) of the print is transformed by using the non-self-luminous direct transformation table LUT1, which has been calculated-in the manner described above. Also, in a step S2, black color $L^*a^*b^*$ signals (L0*, a0*, b0*), which have been transformed with the Von Kries's chromatic adaptation model, are obtained. Thereafter, in a step S3, the $L^*a^*b^*$ signals (L0*, a0*, b0*) are transformed in accordance with the self-luminous inverse transformation table LUT4, and the values of the black color of the print are thereby transformed into the values of the black color of the NIFCRT. Further, in a step S4, a judgment is made as to whether the thus obtained values fall or do not fall within the color reproduction range. In cases where it has been judged that the values fall within the color reproduction range, the aforesaid $L^*a^*b^*$ signals (L0*, a0*, b0*) are obtained as signals (L1*, a1*, b1*). In cases where it has been judged that the values do not fall within the color reproduction range, in a step S5, a0* and b0* are kept at the same values, $\Delta L^*$ is subtracted from L0*, and the value of L0* is thereby adjusted. In this case, in order for the limit of the raising of the gradation without the DP gray balance being changed, a0* and b0* are kept at the same values. The processing of the steps S3, S4, and S5 is repeated until, in the step S4, it is judged that the values fall within the color reproduction range. In this manner, the values (L1*, a1*, b1*) of the $L^*a^*b^*$ signals (L0*, a0*, b0*) are obtained.

After the values (L1*, a1*, b1*) have been obtained in the manner described above, the dynamic range compensation processing is carried out in accordance with Formula (18) shown below.

$$L^* = (L^*w1 - L1^*)/L^*w0 - L0^*) \times (L^* - L0^*) + L1^* \quad (18)$$

wherein $L^*$ represents the transformation range information. In Formula (18) shown above, the white is transformed from $L^*w0$ into $L^*w1$ (actually, $L^*w0 = L^*w1$). In such cases, instead of $L^*$ being used, Y may be used as the transformation range information.

Thereafter, the dynamic range compensation is carried out for transforming the dynamic range of the DP image signals into the dynamic range of the NIFCRT image signals in accordance with the non-self-luminous direct transformation table LUT1, which has been obtained in the manner described above. Also, the color transformation is carried out for transforming the RGB signals for the DP into the RGB signals for the NIFCRT in accordance with the chromatic adaptation model (in this embodiment, the Von Kries's chromatic adaptation model) such that the appearances of the perceived colors may become identical between the image displayed on the DP and the image displayed on the NIFCRT.

Specifically, in this embodiment, the dynamic range compensation and the color transformation are carried out in the manner described below. Firstly, with respect to each lattice point, the RGB signals capable of being displayed on the DP are transformed into the XYZ signals. Thereafter, the signal transformation in accordance with the Von Kries's chromatic adaptation model is carried out in accordance with the Von Kries's matrix, which has been obtained previously. Also, the dynamic range compensation of the XYZ signals is carried out in accordance with the transformation range information, which has been obtained previously. Finally, the XYZ signals are transformed into the RGB signals for the NIFCRT in accordance with the self-luminous inverse transformation table LUT4. The information representing the correspondence relationship between the RGB signals capable of being displayed on the DP and the RGB signals for the NIFCRT, which have been calculated in the manner described above, is stored in the form of an LUT in the storage device 70. In this manner, the color direct transformation table 110 is formed.

How the color inverse transformation table is formed by the color inverse transformation table forming apparatus in the constitution shown in FIG. 1 will be described hereinbelow.

Basically, the color inverse transformation table may be formed in the same manner as that for the color direct transformation table, except that the direction of signal transformation is reverse. Specifically, the dynamic range inverse compensation is carried out for transforming the dynamic range of the RGB signals for the NIFCRT into the dynamic range of the RGB signals for the DP in accordance with the self-luminous direct transformation table LUT3. Also, the color inverse transformation is carried out for transforming the RGB signals for the NIFCRT into the RGB signals for the DP in accordance with the chromatic adaptation model (in this embodiment, the Von Kries's chromatic adaptation model) such that the appearances of the perceived colors may become identical between the image displayed on the NIFCRT and the image displayed on the DP. The dynamic range inverse compensation and the color inverse transformation, which are carried out in this embodiment, will be briefly described hereinbelow.

Firstly, in order for the signal transformation to be carried out in accordance with the Von Kries's chromatic adaptation model, the inverse matrix of the aforesaid Von Kries's matrix is calculated by the calculation device. In such cases, the same parameters as those used in the calculation of the Von Kries's matrix may be used. Alternatively, instead of the parameters being set, only the information representing the Von Kries's matrix may be received, and the inverse matrix may be calculated directly.

Thereafter, with respect to each lattice point, the RGB signals capable of being displayed on the NIFCRT are transformed into the XYZ signals. Also, the dynamic range inverse compensation is carried out on the thus obtained XYZ signals in accordance with the transformation range information, which has been obtained previously. (In the dynamic range inverse compensation, the same technique as that for the aforesaid dynamic range compensation may be employed. However, the transformation range information is represented by a formula, which is obtained by solving Formula (18) shown above for L* in the right term.) Further, the signal transformation in accordance with the Von Kries's chromatic adaptation model is carried out in accordance with the Von Kries's inverse matrix, which has been obtained previously. (At this stage, the signals are still the XYZ signals.) Finally, the XYZ signals are transformed into the RGB signals for the DP in accordance with the non-self-luminous inverse transformation table LUT2. The information representing the correspondence relationship between the RGB signals capable of being displayed on the NIFCRT and the RGB signals for the DP, which have been calculated in the manner described above, is stored in the form of an LUT in the storage device 72. In this manner, a color inverse transformation table 210 is formed.

In the manner described above, when the color inverse transformation table is formed, the dynamic range inverse compensation is carried out by using the same transformation range information as the transformation range information used in the formation of the color direct transformation table. Also, the signal transformation is carried out in accordance with the Von Kries's chromatic adaptation model based upon the same parameters. Therefore, in cases where the original image signals for the DP are transformed into the image signals for the NIFCRT, and the thus obtained image signals for the NIFCRT are transformed to the image signals for the DP, the original image signals for the DP and the image signals for the DP, which have finally been transformed from the image signals for the NIFCRT, become identical with each other. Thus a failure in image signals, which will otherwise often occur from signal transformation, does not occur.

In the aforesaid embodiment, the non-self-luminous direct transformation relationship, the non-self-luminous inverse transformation relationship, the self-luminous direct transformation relationship, and the self-luminous inverse transformation relationship are set in the form of LUT'S. However, the above-enumerated relationships need not necessarily take on the form of LUT Is and may take on the form of predetermined functions, or the like.

Figure 6:
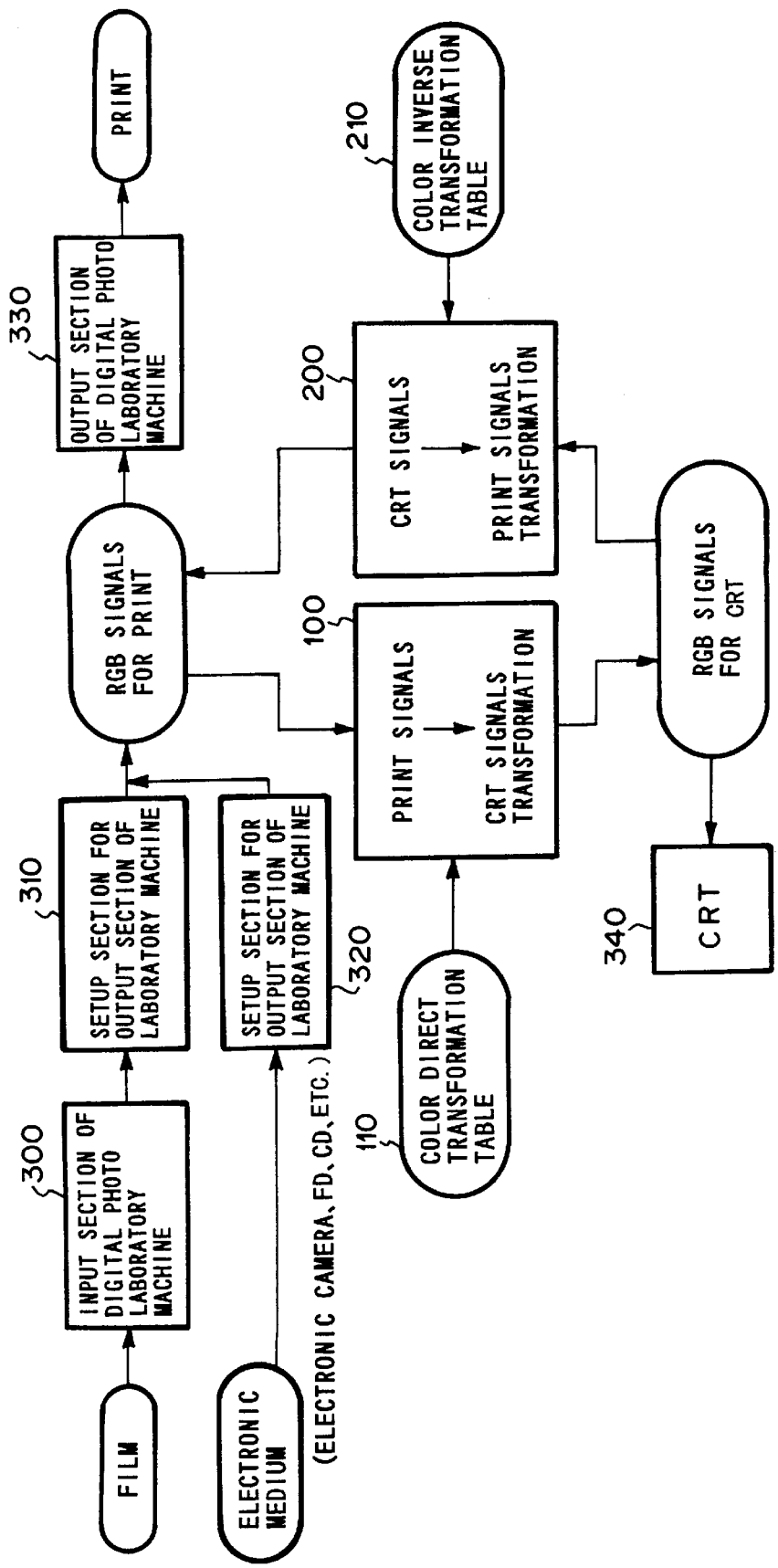
FIG. 6 is a schematic block diagram showing an embodiment of the apparatus for transforming colors of an image in accordance with the present invention.

The color direct transformation table and the color inverse transformation table in accordance with the present invention (the combination of them will hereinbelow be referred to as the color transformation table) can be utilized in a system (the apparatus for transforming colors of an image) for carrying out image signal transformation such that the color appearances may become identical between a hard copy image, which is displayed on the non-self-luminous displaying medium, an a soft copy image, which is displayed on the self-luminous displaying medium, such as the CRT display device. For example, the color transformation table can be utilized in a DPC system, in which the printer for forming a hard copy, such as a photograph, and the CRT display device are combined with each other. FIG. 6 shows an embodiment of the apparatus for transforming colors of an image in accordance with the present invention, in which the color transformation table having been obtained in the manner described above is utilized. As illustrated in FIG. 6, the color transforming apparatus comprises an image signal transforming device 100 for transforming the RGB signals for the print in to the RGB signals for the CRT display device, and a color direct transformation table 110. The color transforming apparatus also comprises an image signal inverse transformation device 200 for transforming the RGB signals for the CRT display device into the RGB signals for the print, and a color inverse transformation table 210. The color transforming apparatus further comprises an input section 300 of a digital photo laboratory machine, setup sections 310, 320 for an output section of a laboratory machine, an output section 330 of a digital photo laboratory machine, and a CRT display device 340.

Film, on which an image has been recorded with a camera, or the like, is fed into the input section 300 of the digital photo laboratory machine, subjected to predetermined processing, such as development processing, and then transformed into the RGB signals for the print in the setup section 310 for the output section of the laboratory machine. Also, image signals, which have been obtained with an electronic image medium,, such as an electronic camera or a floppy disk (FD), are fed into the setup section 320 for the output section of the laboratory machine and transformed into the RGB signals for the print as in the cases of the film. The thus obtained RGB signals for the print are fed into the output section 330 of the digital photo laboratory machine and used to form the print in the output section 330 of the digital photo laboratory machine.

The RGB signals for the print are also fed into the image signal transforming device 100. The image signal transforming device 100 transforms the RGB signals for the print into the RGB signals for the CRT display device by making reference to the color direct transformation table 110. The thus obtained RGB signals for the CRT display device are fed into the CRT display device 340 and reproduced and displayed as a visible image on the CRT display device 340. The thus obtained RGB signals for the CRT display device may also be stored on a floppy disk, or the like, furnished to the user, and used to display the visible image on a CRT display device of the user. In such cases, the user can carry out processing, such as insertion of character patterns into the image displayed on the CRT display device. The image signals, which have been obtained from such processing carried out by the user, may be stored on a floppy disk, or the like, furnished to a photo processing shop, and reproduced as a print. In such cases, the RGB signals for the CRT display device are fed into the image signal inverse transformation device 200. The image signal inverse transformation device 200 transforms the RGB signals for the CRT display device into the RGB signals for the print by making reference to the color inverse transformation table 210. The thus obtained RGB signals for the print are fed into the output section 330 of the digital photo laboratory machine and outputted as a print by the output section 330 of the digital photo laboratory machine.

With the constitution described above, the signal transformation between the RGB signals for the print and the RGB signals for the CRT display device is carried out by making reference to the color transformation table. In this manner, for example, with respect to various image signals for prints, which have been obtained from the film, the electronic image medium, and the like, the signal transformation can be carried out such that the color appearances may become identical between the printed image and the image displayed on the CRT display image. Therefore, in cases where a large number of final prints are to be formed, pre-printing need not be carried out, and color correction can be carried out accurately only with the image displayed on the CRT display device.

In this embodiment, as the RGB signals for the CRT display device, only those transformed from the RGB signals for the print are utilized. However, the color transforming apparatus is not limited to the aforesaid embodiment. For example, the color transforming apparatus may be utilized as an apparatus, wherein image signals obtained from other signal processing are received as the RGB signals for the CRT display device and transformed into the RGB signals for the print by making reference to the color transformation table, such that the color appearances may become identical between the image, which is reproduced from the image signals having been obtained from the other signal processing and is displayed on the CRT display device, and the image, which is printed in accordance with the RGB signals for the print having been obtained from the transformation.

What is claimed is:

1. A method of forming a color transformation look-up table, comprising:
    i) calculating a first correspondence relationship for a first transformation of color signals, which are capable of being reproduced on a non-self-luminous displaying medium, from first colorimetric system signals into second colorimetric system signals,
    ii) calculating a second correspondence relationship for a second transformation of color signals, which are capable of being reproduced on a self-luminous displaying medium, from the second colorimetric system signals into the first colorimetric system signals,
    iii) carrying out dynamic range compensation for transforming the dynamic range of the color signals, which are capable of being reproduced on the non-self-luminous displaying medium, into the dynamic range of the color signals, which are capable of being reproduced on the self-luminous displaying medium, in accordance with said first correspondence relationship and said second correspondence relationship, the transforming being carried out for the respective color signals, which are capable of being reproduced on the non-self-luminous displaying medium,
    iv) carrying out color transformation for transforming the color signals, which are capable of being reproduced on the non-self-luminous displaying medium, into the color signals, which are capable of being reproduced on the self-luminous displaying medium, in accordance with a chromatic adaptation model such that the appearances of perceived colors may become identical between the image displayed on the non-self-luminous displaying medium, and
    v) storing the color signals, which are capable of being reproduced on the non-self-luminous displaying medium, and the corresponding color signals capable of being reproduced on the self-luminous displaying medium, which have been obtained from said dynamic range compensation and said color transformation.

2. The method of forming a color transformation look-up table as in claim 1 wherein said color transformation comprises:
    a) carrying out direct transformation of the first calorimetric system signals of the color signals, which are capable of being reproduced on the non-self-luminous displaying medium, into the second calorimetric system signals, said direct transformation being carried out in accordance with said first correspondence relationship,
    b) carrying out chromatic adaptation transformation in accordance with the chromatic adaptation model on the second calorimetric system signals, which have been obtained from said direct transformation, and
    c) carrying out inverse transformation of the signals, which have been obtained from said chromatic adaptation transformation, into the first colorimetric system signals, said inverse transformation being carried out in accordance with said second correspondence relationship.

3. The method of forming a color transformation look-up table as in claim 2 wherein said color transformation comprises:
    a) forming transformation range information in accordance with said first correspondence relationship and said second correspondence relationship, and
    b) transforming the signals, which have been obtained from said chromatic adaptation transformation or said direct transformation, in accordance with said transformation range information and between said chromatic adaptation transformation and said inverse transformation or between said direct transformation and said chromatic adaptation transformation.

4. The method of forming a color transformation look-up table as in claim 1 wherein said first correspondence relationship is calculated with a technique for estimating signals outside a color reproduction range and with an inverse transformation operation, which utilizes a Newton-Raphson technique.

5. A method for transforming colors of an image, which comprises transforming image signals for a non-self-luminous displaying medium into image signals for a self-luminous displaying medium utilizing the color transformation table of claim 1.

6. A color transformation look-up table formed by the method of claim 1.

7. An apparatus for forming a color transformation look-up table, comprising:
    i) a first calculator adapted to calculate a first correspondence relationship for transformation of color signals, which are capable of being reproduced on a non-selfluminous displaying medium, from first calorimetric system signals into second calorimetric system signals, ii) a second calculator adapted to calculate second correspondence relationship for transformation of color signals, which are capable of being reproduced on a self-luminous displaying medium, from the second colorimetric system signals into the first colorimetric system signals, iii) a dynamic range compensating function for carrying out dynamic range compensation for a compensating transformation of a dynamic range of the color signals, which are capable of being reproduced on the non-self-luminous displaying medium, into the dynamic range of the color signals, which are capable of being reproduced on the self-luminous displaying medium, in accordance with said first correspondence relationship and said second correspondence relationship, the compensating transformation being carried out for the color signals, which are capable of being reproduced on the non-self-luminous displaying medium, iv) a color transforming function adapted to carry out color transformation for transforming the color signals, which are capable of being reproduced on the non-self-luminous displaying medium, into the color signals, which are capable of being reproduced on the self-luminous displaying medium, in accordance with a chromatic adaptation model such that the appearances of perceived colors may become identical between an image displayed on the self-luminous displaying medium and the image displayed on the non-self-luminous displaying medium, and v) a storage unit for storing the color signals, which are capable of being reproduced on the non-self-luminous displaying medium, and the corresponding color signals capable of being reproduced on the self-luminous displaying medium, which have been obtained from said dynamic range compensation and said color transformation.

8. The apparatus for forming a color transformation look-up table as in claim 7 wherein said color transforming function comprises:

a) a direct transformation function adapted to carry out direct transformation of the first colorimetrics system signals of the color signals, which are capable of being reproduced on the non-self-luminous displaying medium, into the second colorimetric system signals, said direct transformation being carried out in accordance with said first correspondence relationship, b) a chromatic adaptation transformation function adapted to carry out chromatic adaptation transformation in accordance with the chromatic adaptation model on the second colorimetric system signals, which have been obtained from said direct transformation, and c) an inverse transformation function adapted to carry out inverse transformation of the second colorimetric system signals, which have been obtained from said chromatic adaptation transformation, into the first colorimetric system signals, said inverse transformation being carried out in accordance with said second correspondence relationship.

9. The apparatus for forming a color transformation look-up table as in claim 8 wherein said dynamic range compensating function comprises a transformation range information forming device adapted to form transformation range information in accordance with said first correspondence relationship and said second correspondence relationship, and said dynamic range compensating function is adapted to transform the signals, which have been obtained from said chromatic adaptation transformation or said direct transformation, in accordance with said transformation range information and between said chromatic adaptation transformation and said inverse transformation or between said direct transformation and said chromatic adaptation transformation.

10. The apparatus for forming a color transformation look-up table as in claim 7 wherein said first calculator comprises an estimator adapted to estimate signals outside a color reproduction range and an inverse transformation operation function, which utilizes a Newton-Raphson technique.

11. An apparatus for transforming colors of an image, comprising an image signal transforming device for transforming image signals for a non-self-luminous displaying medium into image signals for a self-luminous displaying medium using the color transformation table formed by the apparatus of claim 1.

12. A method of forming a color transformation look-up table, comprising:

i) calculating a first correspondence relationship for transformation of color signals, which are capable of being reproduced on a self-luminous displaying medium, from first colorimetric system signals into second colorimetric system signals, ii) calculating a second correspondence relationship for transformation of color signals, which are capable of being reproduced on a non-self-luminous displaying medium, from the second calorimetric system signals into the first calorimetric system signals, iii) carrying out dynamic range compensation for a compensation transformation of a dynamic range of the color signals, which are capable of being reproduced on the self-luminous displaying medium, into a dynamic range of the color signals, which are capable of being reproduced on the non-self-luminous displaying medium, in accordance with said first correspondence relationship and said second correspondence relationship, the compensation transformation being carried out for the color signals, which are capable of being reproduced on the self-luminous displaying medium, iv) carrying out color transformation for transforming the color signals, which are capable of being reproduced on the self-luminous displaying medium, into the color signals, which are capable of being reproduced on the non-self-luminous displaying medium, in accordance with a chromatic adaptation model such that the appearances of perceived colors may become identical between the image displayed on the non-self-luminous displaying medium and an image displayed on the self-luminous displaying medium, and v) storing the color signals, which are capable of being reproduced on the self-luminous displaying medium, and the corresponding color signals capable of being reproduced on the non-self-luminous displaying medium, which have been obtained from said dynamic range compensation and said color transformation.

13. The method of forming a color transformation look-up table as in claim 12 wherein said color transformation comprises:

a) carrying out direct transformation of the first colorimetric system signals of the color signals, which are capable of being reproduced on the self-luminous displaying medium, into the second colorimetric system signals, said direct transformation being carried out in accordance with said first correspondence relationship, b) carrying out chromatic adaptation transformation in accordance with the chromatic adaptation model on the second colorimetric system signals, which have been obtained from said direct transformation, and c) carrying out inverse transformation of the signals, which have been obtained from said chromatic adaptation transformation, into the first calorimetric system signals, said inverse transformation being carried out in accordance with said second correspondence relationship.

14. The method of forming a color transformation look-up table as in claim 13 wherein said dynamic range compensation comprises:

a) forming transformation range information in accordance with said first correspondence relationship and said second correspondence relationship, and b) transforming the signals, which have been obtained from said chromatic adaptation transformation or said direct transformation, in accordance with said transformation range information and between said chromatic adaptation transformation and said inverse transformation or between said direct transformation and said chromatic adaptation transformation.

15. A method of forming a color transformation look-up table as defined in claim 12 wherein said first correspondence relationship is calculated with a technique for estimating signals outside a color reproduction range and with an inverse transformation operation, which utilizes a Newton-Raphson technique.

16. A method for transforming colors of an image, which comprises carrying out inverse transformation of image signals for a self-luminous displaying medium into image signals for a non-self-luminous displaying medium utilizing the color transformation table formed by the apparatus of claim 13.

17. A color transformation look-up table formed by the method of claim 12.

18. An apparatus for forming a color transformation look-up table comprising:

i) a first calculator adapted to calculate a first correspondence relationship for transformation of color signals, which are capable of being reproduced on the self-luminous displaying medium, from first colorimetric system signals into second colorimetric system signals, ii) a second calculator adapted to calculate second correspondence relationship for transformation of color signals, which are capable of being reproduced on a non-self-luminous displaying medium, from the second colorimetric system signals into the first colorimetric system signals, iii) a dynamic range compensating function for carrying out a dynamic range compensation transformation of a dynamic range of the color signals, which are capable of being reproduced on the self-luminous displaying medium, into a dynamic range of the color signals, which are capable of being reproduced on the non-self-luminous displaying medium, in accordance with said first correspondence relationship and said second correspondence relationship, the compensation transformation being carried out for the color signals, which are capable of being reproduced on the self-luminous displaying medium, iv) a color transforming function adapted to perform color transformation of the color signals, which are capable of being reproduced on the self-luminous displaying medium, into the color signals, which are capable of being reproduced on the non-self-luminous displaying medium, in accordance with a chromatic adaptation model such that the appearances of perceived colors may become identical between the image displayed on the non-self-luminous displaying medium and the image displayed on the self-luminous displaying medium, and v) a storage unit for storing the color signals, which are capable of being reproduced on the self-luminous displaying medium, and the corresponding color signals capable of being reproduced on the non-self-luminous displaying medium, which have been obtained from said dynamic range compensation and said color transformation.

19. The apparatus for forming a color transformation look-up table as in claim 18 wherein said color transforming function comprises:

a) a direct transformation function adapted to perform direct transformation of the first colorimetric system signals of the color signals, which are capable of being reproduced on the self-luminous displaying medium, into the second colorimetric system signals, said direct transformation being carried out in accordance with said first correspondence relationship, b) a chromatic adaptation transformation function for carrying out chromatic adaptation transformation in accordance with a chromatic adaptation model on the second colorimetric system signals, which have been obtained from said direct transformation, and c) an inverse transformation function for carrying out inverse transformation of the signals, which have been obtained from said chromatic adaptation transformation, into the first colorimetric system signals, said inverse transformation being carried out in accordance with said second correspondence relationship.

20. The apparatus for forming a color transformation look-up table as in claim 19 wherein said dynamic range compensating function comprises a transformation range information forming unit for forming transformation range information in accordance with said first correspondence relationship and said second correspondence relationship, and said dynamic range compensating function is adapted to transform the signals, which have been obtained from said chromatic adaptation transformation or said direct transformation, in accordance with said transformation range information and between said chromatic adaptation transformation and said inverse transformation or between said direct transformation and said chromatic adaptation transformation.

21. The apparatus for forming a color transformation look-up table as in claim 18 wherein said first calculator comprises an estimator adapted to estimate signals outside a color reproduction range and an inverse transformation operation function, which utilizes a Newton-Raphson technique.

22. An apparatus for transforming colors of an image, comprising an image signal inverse transformation device for carrying out inverse transformation of image signals of a self-luminous displaying medium into image signals of a non-self-luminous displaying medium utilizing the color transformation look-up table of claim 17.

* * * * *